United States Patent
Sato et al.

(10) Patent No.: US 7,502,902 B2
(45) Date of Patent: Mar. 10, 2009

(54) STORAGE SYSTEM AND DATA MOVEMENT METHOD

(75) Inventors: Yoshitaka Sato, Yokohama (JP); Nobuo Beniyama, Yokohama (JP); Hiroshi Yamakawa, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 216 days.

(21) Appl. No.: 11/133,342

(22) Filed: May 20, 2005

(65) Prior Publication Data

US 2006/0206675 A1 Sep. 14, 2006

(30) Foreign Application Priority Data

Mar. 11, 2005 (JP) .............................. 2005-068783

(51) Int. Cl.
*G06F 12/00* (2006.01)
*G06F 13/00* (2006.01)
*G06F 13/28* (2006.01)
*G06F 17/30* (2006.01)

(52) U.S. Cl. ...................... 711/161; 711/163; 707/204

(58) Field of Classification Search ........................ None
See application file for complete search history.

(56) References Cited

U.S. PATENT DOCUMENTS

| | | | |
|---|---|---|---|
| 5,758,057 A * | 5/1998 | Baba et al. ..................... 714/7 |
| 6,269,382 B1 * | 7/2001 | Cabrera et al. ............... 707/204 |
| 7,092,977 B2 | 8/2006 | Leung et al. ................. 707/205 |
| 7,117,322 B2 | 10/2006 | Hochberg et al. ........... 711/160 |
| 2004/0133611 A1 | 7/2004 | Cabrera et al. ............... 707/203 |
| 2004/0193760 A1 | 9/2004 | Matsunami et al. | |

* cited by examiner

*Primary Examiner*—Hyung S Sough
*Assistant Examiner*—Gary W Cygiel
(74) *Attorney, Agent, or Firm*—Antonelli, Terry, Stout & Kraus, LLP.

(57) ABSTRACT

The storage system of the present invention reflects the intentions of the host device in data migration carried out by a storage device. The host manager registers the host-side data migration policy in advance in the operation management server. When the storage device initiates the data migration, the management server compares the storage-side data migration policy and the host-side data migration policy, and when the polices match, the storage device is permitted to carry out the data migration. When the policies do not match, the management server prohibits the storage device from carrying out the data migration. The management server counts the number of times that the policies do not match, and generates and sends a report to the managers in order to draw the attention of the host manager and the storage manager.

8 Claims, 18 Drawing Sheets

DATA MIGRATION RULE MANAGEMENT TABLE

| RULE ID | RULE CONTENT | PERMISSION FLAG |
|---|---|---|
| R0001 | MOVE TO LOW SPEED GROUP | PERMIT |
| | MOVE TO HIGH SPEED GROUP | PROHIBIT |
| | MOVE TO LOW REDUNDANCY GROUP | PROHIBIT |
| | MOVE TO HIGH REDUNDANCY GROUP | PROHIBIT |
| R0002 | MOVE TO LOW SPEED GROUP | PERMIT |
| | MOVE TO HIGH SPEED GROUP | PROHIBIT |
| | MOVE TO LOW REDUNDANCY GROUP | PERMIT |
| | MOVE TO HIGH REDUNDANCY GROUP | PROHIBIT |
| R0003 | MOVE TO LOW SPEED GROUP | PERMIT |
| | MOVE TO HIGH SPEED GROUP | PERMIT |
| | MOVE TO LOW REDUNDANCY GROUP | PERMIT |
| | MOVE TO HIGH REDUNDANCY GROUP | PERMIT |
| ... | ... | ... |

T2

HOST-SIDE MIGRATION POLICY REGISTRATION TABLE

| VOLUME ID | RULE ID | AUTOMATIC RELOCATION PERMISSION |
|---|---|---|
| V0001 | R0001 | PROHIBIT |
| V0002 | R0003 | AM 3:00 |
| V0003 | R0002 | PM 1:00 |
| ... | ... | ... |

DATA MIGRATION PROCESSING REPORT (TO STORAGE MANAGER)

VOLUME V0001 SHOULD BE MOVED, BUT DATA MIGRATION CANNOT BE CARRIED OUT PER HOST-SIDE INSTRUCTIONS.

STORAGE-SIDE DATA MIGRATION POLICY MUST BE REVIEWED.

PLEASE CONSULT WITH HOST-SIDE MANAGER (CONTACT ADDRESS).

| VOLUME ID | DISK TYPE MISMATCH COUNTER | STORAGE REDUNDANCY MISMATCH COUNTER | TOTAL MISMATCH COUNTER |
|---|---|---|---|
| V0001 | 5 | 5 | 10 |

R2

DATA MIGRATION PROCESSING REPORT (TO HOST MANAGER)

I/O CHARACTERISTICS AND CURRENT DATA MIGRATION POLICY OF VOLUME V0001 DO NOT MATCH.

HOST-SIDE DATA MIGRATION POLICY MUST BE REVIEWED.

PLEASE CONSULT WITH STORAGE-SIDE MANAGER (CONTACT ADDRESS).

| | | |
|---|---|---|
| V0001 | MOVE TO LOW-SPEED GROUP | PERMIT |
| | MOVE TO HIGH-SPEED GROUP | PROHIBIT |
| | MOVE TO LOW-REDUNDANCY GROUP | PROHIBIT |
| | MOVE TO HIGH-REDUNDANCY GROUP | PROHIBIT |

DATA MIGRATION PROCESSING REPORT (TO ALL HOST MANAGERS)

I/O CHARACTERISTICS AND CURRENT DATA MIGRATION POLICY OF VOLUME V0001 DO NOT MATCH.

HOST-SIDE DATA MIGRATION POLICY MUST BE REVIEWED.

PLEASE CONSULT WITH OTHER HOST MANAGERS (CONTACT ADDRESS) AND STORAGE MANAGER (CONTACT ADDRESS) CONCERNING THE STORAGE SHARING METHOD.

| VOLUME ID | DISK TYPE MISMATCH COUNTER | STORAGE REDUNDANCY MISMATCH COUNTER | TOTAL MISMATCH COUNTER |
|---|---|---|---|
| V0001 | 5 | 5 | 10 |

| | | |
|---|---|---|
| | MOVE TO LOW-SPEED GROUP | PERMIT |
| V0001 | MOVE TO HIGH-SPEED GROUP | PROHIBIT |
| | MOVE TO LOW-REDUNDANCY GROUP | PROHIBIT |
| | MOVE TO HIGH-REDUNDANCY GROUP | PROHIBIT |

T7

| STORAGE USE MANAGEMENT TABLE | | | | | |
|---|---|---|---|---|---|
| | | HOST H1 | HOST H2 | HOST H3 | TOTAL |
| HIGH-SPEED DISK | STORAGE REDUNDANCY (HIGH) | 50% | 20% | 10% | 80% |
| | STORAGE REDUNDANCY (LOW) | 50% | 30% | 10% | 90% |
| LOW-SPEED DISK | STORAGE REDUNDANCY (HIGH) | 20% | 15% | 15% | 50% |
| | STORAGE REDUNDANCY (LOW) | 10% | 10% | 15% | 35% |

STORAGE SYSTEM AND DATA MOVEMENT METHOD

CROSS-REFERENCE TO RELATED APPLICATIONS

This application relates to and claims priority from Japanese Patent Application No. 2005-68783 filed on Mar. 11, 2005, the entire disclosure of which is incorporated herein by reference.

BACKGROUND OF THE INVENTION

1. Field of the Invention

The present invention relates a storage system and a data movement method that can move data among a plurality of types of storage areas.

2. Description of the Related Art

The storage system is composed of a large number of disk drives arranged in the form of an array, and provides storage area based on RAID (Redundant Array of Independent Disks). A logical volume, which is the logical storage area, is formed in the physical storage area possessed by the disk drives. A server or another host device can access the desired volume, and read and write data by issuing a prescribed command to the storage system.

A very large amount of data accumulates in the storage system in accordance with the operation of the storage system. In view of the above, a so-called data migration technique has been proposed (Japanese Laid-open Patent Application 2004-295457) whereby data with a high frequency of use is stored in a high-speed disk drive, and data with a low frequency of use is stored in a low-speed disk drive.

In the prior art cited in the reference, hierarchical storage control (data migration) based on the characteristics of the file is implemented in the storage device without reliance upon a host device. In the referenced technique, storage resources are effectively used by moving data exclusively from the vantage point of the storage device.

When the size of the storage system is relatively small, for example, and there is adequate communication between the storage device manager (hereinafter referred to as "storage manager") and the host device manager (hereinafter referred to as "host manager"), no particular problems occur if data is moved with consideration given exclusively to the situation of the storage device.

In the contrasting case of a large storage system that includes a plurality of host devices and a plurality of storage devices, the duty allotment of the host manager and the storage manager increase. As a result, it is more difficult to manage in advance intentions with regard to data migration between the host manager and the storage manager.

When data is moved from one disk to another disk on the exclusive basis of the situation and vantage point of the storage device, as in the above-cited reference, the data movement would be welcomed by the storage manager, but not necessarily so by the host manager. This is because the intention of the host manager is not considered in any way in this data movement.

Assume a model of ordinary ILM (Information Lifecycle Management) in which data access frequency is high in the first stage of generation, the access frequency decreases with the passage of time, and the data is finally not accessed at all. In such a model, data is stored in a high-speed disk in the first stage of data generation, for example, and when the access frequency decreases, the data is moved from the high-speed disk to a low-speed disk; and the data is ultimately backed up to a tape device or the like and used offsite.

However, not all data matches such a standard model. Web server access logs, mail server transmission logs, and other such data require high-speed access during the generation thereof, for example, and the access frequency decreases with the passage of time, but inspection and monitoring may be carried out at regular or irregular intervals.

For instance, the access log and the transmission log are used to inspect the security of the server, and to confirm, among other things, whether trade secrets have leaked by the e-mail transmitted from inside the company to the outside. The host manager prefers to have the access log and the transmission log to be stored on a high-speed disk in order to complete such an inspection in a short time. However, the storage manager, which has not been informed of the inspection schedule, moves the access log and the transmission log to a lower speed disk. As a result, data that requires high-speed access is moved to a low-speed disk, contrary to the expectations of the host manager, and the convenience of the storage system decreases.

SUMMARY OF THE INVENTION

In view of the above, an object of the present invention is to provide a storage system and data movement method that can control data migration performed by a storage device with consideration given to the situation of the host device. Another object of the present invention is to provide a storage system and data movement method that can reflect the intentions of the host device with respect to the storage device that relocates the volume in accordance with a prescribed movement policy. Other objects of the present invention will be made apparent from the embodiments described below.

To resolve the above-described issues, the storage system in accordance with one aspect of the present invention has at least one or more host devices, a storage device for providing to the host device a volume disposed in a prescribed storage area selected from a plurality of types of storage areas, and a management device connected to the host device and the storage device, for managing the movement of the volume between the storage areas, wherein the management device determines whether to permit or deny the movement of the volume on the basis of the host device directions related to the movement of the volume, and on the basis of the scheduled movement of the volume by the storage device.

The storage device is provided with, for example, a high-speed disk drive and a low-speed disk drive, and multi-tiered storage areas such as a storage area with high storage redundancy such as RAID5 and a storage area with low storage redundancy such as RAID0 or RAID1. The storage device can move volumes between hierarchical levels in accordance with its own policy. For instance, the storage device can move a volume whose access frequency has decreased from a high-speed storage area to a low-speed storage area.

When the volume is relocated by the storage device, the management device determines whether to permit the movement of the volume with consideration given to both the policy of the storage device and the directions from the host device. The management device prohibits the movement of the volume when the movement schedule (the type of storage area to which the target volume is to be moved) of the storage device and directions from the host device conflict or collide. The unit-specific situation of the host can be reflected in the movement of the volume, and the convenience of the storage system can be improved.

In an embodiment of the present invention, the storage unit can move the volume between storage areas on the basis of at least one or more first sets of movement policy information in which the movement policy of the volume is set, and the management device determines whether to permit the movement of the volume by comparing the first set of movement policy information and a second set of policy movement information. related to the movement policy of the volume specified by the host device, when the volume is to be moved between the storage areas.

The management device can produce a first set of movement policy information by acquiring from the storage device prescribed basic information required to create a first set of movement policy information.

In an embodiment of the present invention, a movement policy storage unit for storing in advance the second set of movement policy information is provided to the storage device, and the management device determines whether to permit the movement of the volume by comparing the first set of movement policy information acquired from the storage device and the second set of policy movement information stored in advance in the movement policy storage unit, when the movement of the volume between the storage areas is requested by either the host device or the storage device.

The second set of movement policy information includes the intension and desire of the host device in relation to the movement (relocation) of the volume. Even if the host device is stopped by an unexpected problem, a planned stop, or the like, the intention of the host device is reflected and the volume can be moved by storing in advance and keeping a second set of movement policy information.

In an embodiment of the present invention, the management device permits the movement of the volume to the storage device when the first set of movement policy information and the second set of movement policy information are congruent, and prohibits the movement of the volume when the first set of movement policy information and the second set of movement policy information are incongruent.

As used herein, movement policy information congruence typically refers to agreement between the first and second sets of movement policy information. When movement policy information is not in agreement, the first and second sets of movement policy information are not in agreement.

However, this definition is not limited to the congruence of the two groups of settings, and "congruence" can also be determined when the directionality of the two are in agreement (essentially in agreement), for example. When the movement policy of the storage device is "move the volume from the FC (Fibre Channel) disk to the SATA (Serial AT Attachment)," and the movement policy of the host device is "permit the movement of the volume to a lower-speed storage area," the movement policies of the two are essentially in agreement. In this case, the movement of the volume is permitted.

In an embodiment of the present invention, the storage device switches the first set of movement policy information to another first set of movement policy information and queries the management device for permission to move the volume, when permission to move the volume was not received from the management device.

A plurality of the types of movement policies can be preset in the storage device. When the initially selected movement policy is denied by the management device, the storage device can reselect another movement policy and query the management device for permission.

In an embodiment of the present invention, the management device is provided with a comparison result storage unit for storing information of the result of comparing the first set of movement policy information and second set of movement policy information, and a notification unit for providing notification to the storage device, the host device, or both regarding the movement of the volume on the basis of the information of the comparison result stored in the comparison result storage unit.

In an embodiment of the present invention, the content of the differences when the first set of movement policy information and second set of movement policy information are incongruent is stored in the comparison result storage unit.

When the movement policy of the host device and the movement policy of the storage device are incongruent, the movement of the volume is prohibited, and the fact that the movement has been prohibited and the content of the differences are stored in the comparison result storage unit. The notification unit provides notification to the storage device, the host device, or both regarding the movement of the volume. This notification can include the content of the differences and the fact that the movement of the volume has been prohibited. The host manager and/or the storage manager can determine whether the movement policies of the devices are appropriate on the basis of the notification.

In an embodiment of the present invention, the number of times that the first set of movement policy information and the second set of movement policy information are incongruent and the content of the differences of the sets of movement policy information are associated and stored in the comparison result storage unit, and the notification unit provides notification when there is a request from the host device or the storage device, or when the number of times that the movement policy information has been incongruent has reached a prescribed value set in advance.

In another embodiment of the present invention, the notification unit provides notification to each of the host devices when there is a plurality of host devices present.

When one or a plurality of storage devices are shared by a plurality of host devices, the service status of the storage device by one of the host devices can affect the use of the storage device by other host devices. In view of the above, consultation relating to the use of the storage device can be carried out among the host managers by sharing the information related to the movement of the volume between host devices that share the storage device.

In an embodiment of the present invention, the plurality of types of storage areas are configured so that one or both the characteristics and the storage redundancy of the physical storage devices that provide the storage areas are different, and the policy related to the movement of the volume is set in advance in the first set of movement policy information and second set of movement policy information on the basis of the characteristics and the storage redundancy of the storage devices.

Examples of physical storage devices include hard disk drives, semiconductor memory drives, and optical disk drives. The characteristics of the storage device refers to the technical properties derived from the physical or logical structure of the storage device, and examples thereof include the magnitude of the access speed, the queue structure, and the buffer size.

Storage redundancy refers to the level of redundancy when storing data, and specific examples thereof include RAID0, RAID1, RAID3, and RAID5. The storage areas can be divided into a plurality of categories by combining the two attributes: storage device and storage redundancy.

The data movement method in accordance with another aspect of the present invention is a data movement method for moving a data constellation that is used by a host device between a plurality of types of storage areas provided by the storage device, having a step for storing the movement policy of the host device related to the movement of the data constellation, a step for acquiring a movement policy of the storage device related to the movement of the data constellation when a data constellation movement request has been generated, a step for comparing the stored movement policy of the host device and the acquired movement policy of the storage device, and determining whether both are congruent, a step for permitting the movement of the data constellation when the movement policies are congruent, a step for storing points of difference between the movement policy of the host device and the movement policy of the storage device when the movement policies are incongruent, and a step for notifying one or both of the storage device and host device of the information related to the points of difference.

The management device in accordance with yet another aspect of the present invention is a management device that is connected to both a host device and a storage device, for managing the movement of a volume provided by the storage device to the host device, wherein the storage device can move the volume between a plurality of types of storage areas on the basis of at least one or more first sets of movement policy information in which the movement policy of the volume is set, and the management device determines whether the movement of the volume is permitted by comparing the first set of movement policy information and the second set of movement policy information related to the movement policy of the volume specified by the host device when moving the volume between the storage areas.

A portion of the devices, functions, or steps of the present invention may be configured as a computer program. In such a case, the computer program can be fixed in a hard disk, semiconductor memory, optical disk, or another storage medium and distributed, or may be distributed via a communication network.

BRIEF DESCRIPTION OF THE DRAWINGS

FIG. 5 is a diagram showing the configuration of a data migration rule management table and a host-side data migration policy registration table;

FIG. 15 is a diagram showing the configuration of the report;

FIG. 18 is a diagram showing the configuration of a report that is provided in common to the managers.

DESCRIPTION OF THE PREFERRED EMBODIMENTS

Figure 1:
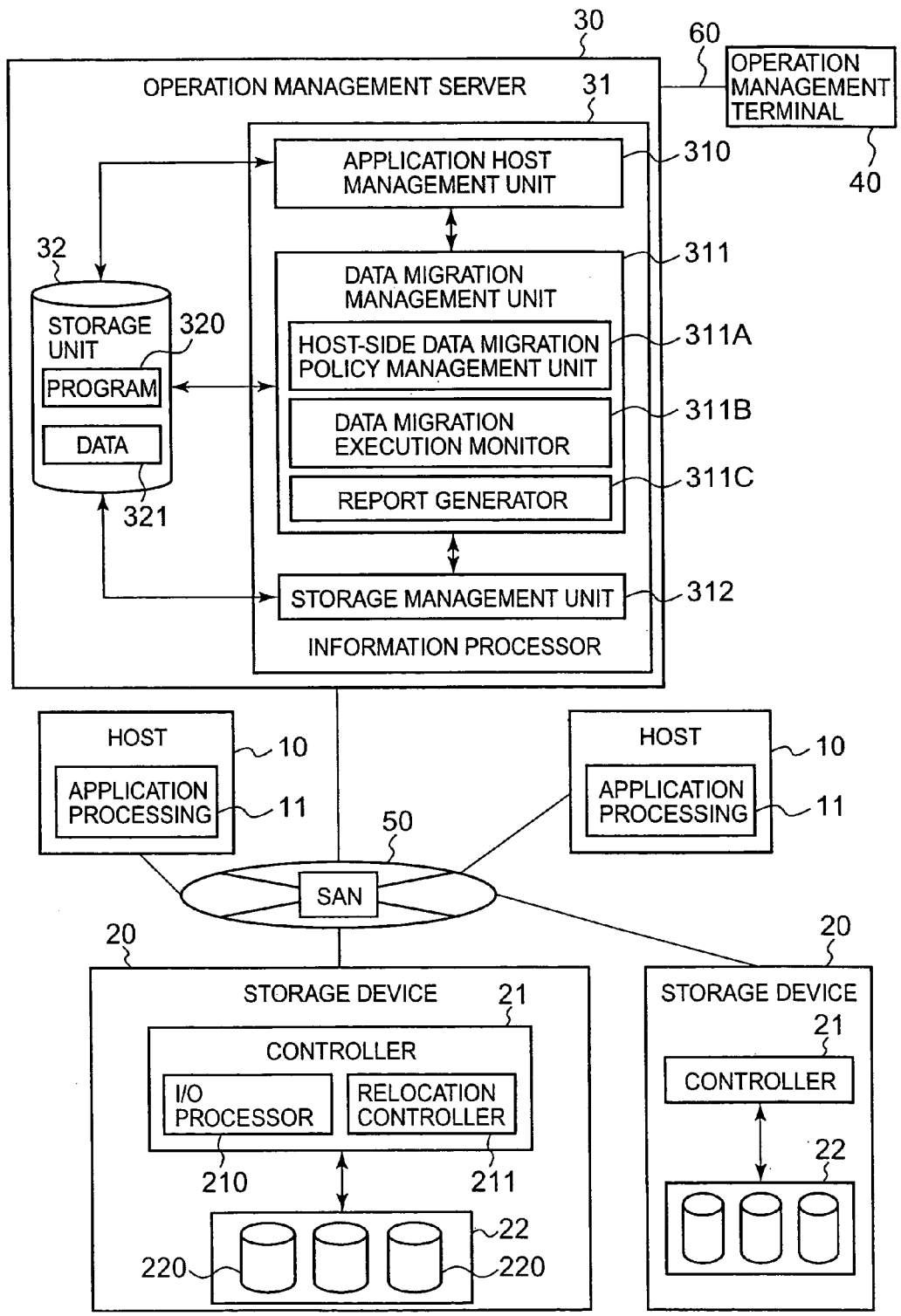
FIG. 1 is a block diagram showing the overall configuration of an embodiment of the present invention.

Embodiments of the present invention are described below with reference to the diagrams. The storage system of the present embodiment is provided with at least one or more host devices (10), a storage device (20) that provides to the host device (10) a volume (220) disposed in a prescribed storage area of the plurality of types of storage areas (222), and a management device (30) that is connected to the host device (10) and the storage device (20) and manages the movement of a volume (220) between the plurality of types of storage areas (222), as described below. The managing device (30) determines whether the movement of the volume is permitted based on the directions of the host device (10) related to the movement of the volume (220) and the movement schedule of the volume (220) by the storage device (20). Thus, in the present embodiment, the intention of the host device (10) can be reflected in the relocation of the volume (220) by the storage device (20).

Embodiment 1

FIG. 1 is a block diagram showing the overall configuration of a storage system. This system can be composed of a plurality of host devices 10, a storage device 20, an operation management server 30, and an operation management terminal 40, for example.

The host devices 10, storage device 20, and operation management server 30 are each connected in a manner that allows duplex communication via an FC_SAN (Fibrere Channel_Storage Area Network), an IP_SAN (Internet Protocol_SAN), or another network 50, for example. The operation management server 30 and operation management terminal 40 are connected in a manner that allows duplex communication by way of a LAN (Local Area Network), a WAN (Wide Area Network), or another network 60, for example. The host devices 10, storage device 20, operation management server 30, and operation management terminal 40 may be configured by connecting each to a common network.

The host device 10 is a computer that is configured as a server, mainframe, or the like. The host device 10 is provided with at least one or more application processors 11. The application processor 11 implements services provided to the client terminal (not shown), such as an email transmission and receiving service, video distribution service, database service, and web page provider service.

The host devices 10 can each execute a plurality of types of application programs. The system can also be configured so that the same application program is executable by different host devices 10, as in the case in which one host device 10 is used as an active server and another host device 10 is used as a backup server.

The storage device 20 is configured as a disk array subsystem, for example, and is provided with a controller 21 and a storage unit 22. The storage device 20 provides a volume 220 to each to the host devices 10.

The controller 21 is provided with an I/O processor 210 for processing write commands, read commands, and other commands from the host devices 10, and a relocation control unit 211 for controlling the storage position of the volume 220. The storage unit 22 has a plurality of storage areas, and one or a plurality of volumes 220 can be provided to any one or a plurality of storage areas. The configuration of the host devices 10 and the storage device 20 is described later.

The operation management server 30 manages the operation of the storage system provided with a plurality of host devices 10 and a plurality of storage devices 20. In particular, the operation management server 30 of the present embodiment determines whether the movement of the volume 220 to be carried out by the storage device 20 is permitted. The operation management server 30 can be configured with an information processor 31 and a storage unit 32.

The information processor 31 is configured with the data processing circuit of a CPU (Central Processing Unit), for example, and a plurality of functions 310 to 312 are implemented by reading and executing program code 320 stored in the storage unit 32.

The storage unit 32 may be composed of a ROM (Read Only Memory), a RAM (Random Access Memory), a hard disk, or another storage resource. Program code 320 and data sets 321 are stored in the storage unit 32. More precisely, the program code 320 can be stored in a ROM or hard disk, and the data 321 used or generated by the program code 320 can be stored in a RAM or hard disk. For convenience of description, ROM, RAM, and hard disk will not be differentiated, and will be referred to as "storage unit 32."

The functions 310 to 312 implemented by the information processor 31 will be described. The application host management unit 310 is a function for managing the settings of the host device 10 so that the host device 10 can use the volume 220. The application host management unit 310 sets the access bus information to the volume 220 in the host device 10. The host device 10 can access a prescribed volume 220 on the basis of the access bus information thus set. The application host management unit 310 collects from the host devices 10 data characteristics of the volume 220 used by the host devices 10.

The term "data characteristics" refers to the nature of the data stored in the volume 220, and examples thereof include whether the volume 220 is being used as an archive volume for email, and whether the volume is being used to store customer data that is used by a customer management database.

The data migration management unit 311 has a function for executing the relocation (data migration) of the volume. The data migration management unit 311 approves or denies the movement of data proposed by the storage device 20 on the basis of the intention (data migration policy) of the host manager registered in advance.

The host-side data migration policy management unit 311A has a function for managing the data migration policy (may hereinafter be referred to as "policy") that is set based on the individual circumstances of the host devices 10. Even if the current access frequency of the volume is low, for instance, the host manager can direct in advance that the volume not be moved to a low-speed storage area when the volume is scheduled to be used in an audit that is to be carried out in the near future. In other words, the host-side data migration policy includes conditions for prohibiting the data migration policy of the storage device 20.

The data migration execution monitor (may hereinafter be referred to as "monitor") 311B is a function for comparing the host-side data migration policy and the data migration policy of the storage device 20 and permitting the movement of the volume when both policies are congruent. The monitor 311B detects whether the policy related to the volume movement is different between the host device 10 and the storage device 20, and counts the number of times that both policies are different. The monitor 311B issues a prescribed report when the movement of the volume by the storage device 20 has been denied a prescribed number of times or more.

The report generator 311C is a function for generating a report on the basis of directions from the monitor 311B and providing the report to the host manager and/or the storage manager. The report generated by the report generator 311C is sent to the host manager and the storage manager by an electronic means such a email. A web page may alternatively be set up to display information related to the operation of the storage system, and the report can be displayed on the web page.

The storage management unit 312 has a function whereby information for identifying a host device 10 that can use a prescribed volume 220 is set in the storage device 20 so that the volume 220 can be used by a prescribed host device 10. The host device 10 is identified by the WWN (World Wide Name), iSCSI (Internet Small Computer System Interface) name, or another piece of information that can uniquely identify the device at least within the storage system thereof. The storage device 20 associates the WWN or the like of the host device 10 specified by the operation management server 30 with the LUN (Logical Unit Number) connected to the specified volume 220.

The operation management terminal 40 is a terminal device for inputting directions to the operation management server 30 or for reading information from the operation management server 30.

The operation management server 30 is configured as a computer system composed of separately configured host devices 10 and storage devices 20. However, instead of this configuration, the operation management server 30 can be disposed in any one host device 10 or in any one storage device 20. The operation management server 30 may be configured as a blade computer and mounted in a storage device 20, for example.

The operation management server 30 may be composed of a plurality of computer systems, and configured to manage the movement of volumes by operating the computer systems in a coordinated fashion. In this case, the operation management server 30 can be dispersed in a plurality of host devices 10, in a plurality of storage devices 20, or in the host devices 10 and the storage devices 20. The operation management server 30 may also be disposed in switches, routers, or other relay devices constituting the network 50.

Figure 2:
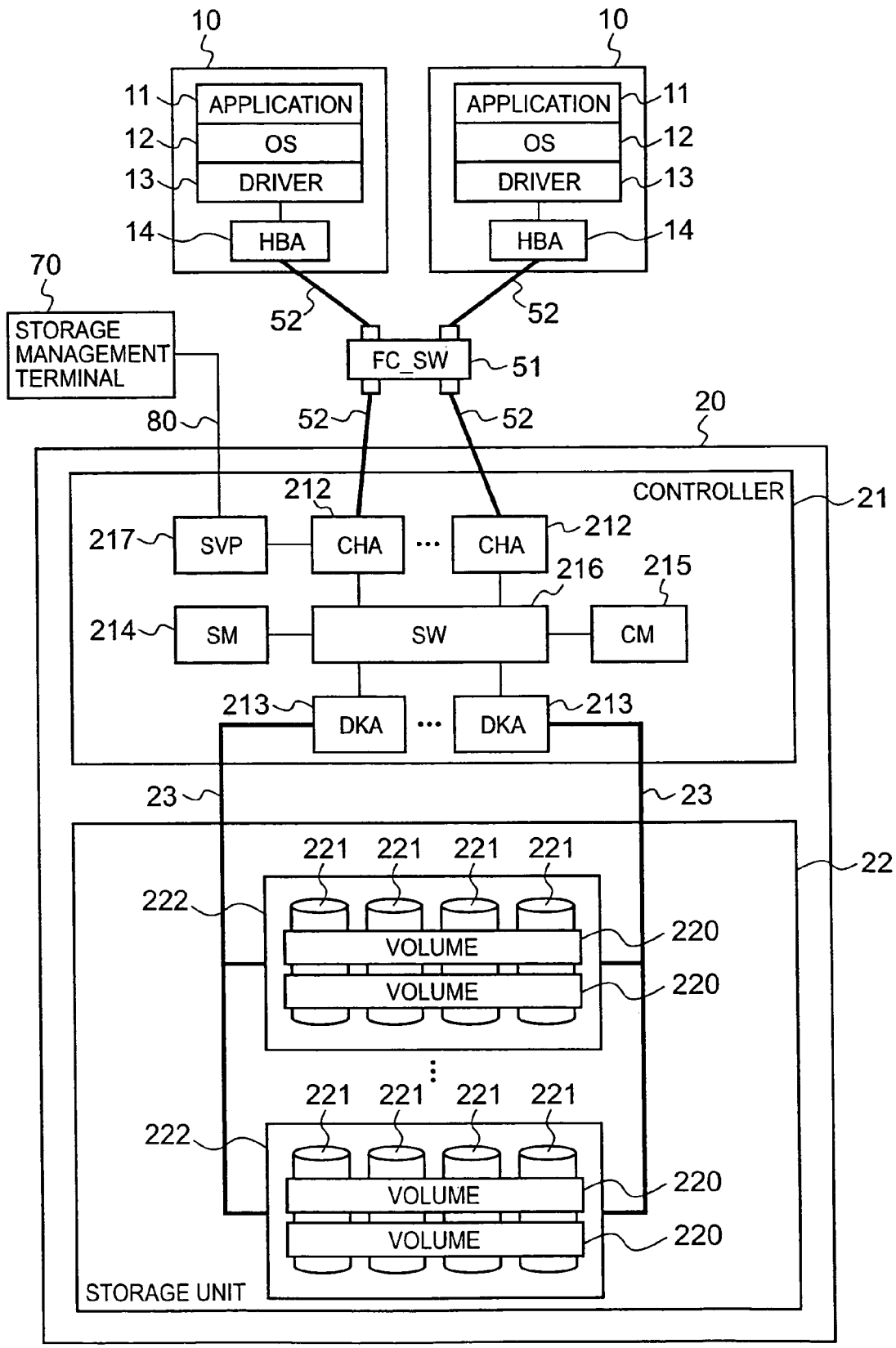
FIG. 2 is a block diagram showing a detailed configuration of the host device and storage device.

FIG. 2 is a block diagram showing the configuration of a host device 10 and a storage device 20. As described above, the host device 10 and the storage device 20 are connected via a network 50. The network 50 can be configured using a LAN, SAN, Internet, dedicated line, or the like, and a switch 51 or another relay device may be included.

When the host device 10 and storage device 20 are connected via a LAN, Internet, or another network, data is moved using TCP/IP (Transmission Control Protocol/Internet Protocol) or another common protocol. When a SAN network is used, the host device 10 and storage device 20 move data on the basis of a FCP (FibreFibre Channel Protocol), for example. When the host device 10 is a mainframe, data is moved in accordance with FICON (Fibre Connection: registered trademark), ESCON (Enterprise System Connection: registered trademark), ACONARC (Advanced Connection Architecture: registered trademark), FIBARC (Fibre Connection Architecture: registered trademark), or another communication protocol.

The host device 10 is provided with application programs 11, an OS (Operating System) 12, and device drivers 13 as the software configuration thereof. The host device 10 may be provided with at least one or more HBA (Host Bus Adapter) 14. When a LAN is used, a communication network card with gigabit speed is used, for example, in lieu of an HBA 14. The application programs 11 access a prescribed volume 220 and write data via an HBA 14 or the like.

The network 50 that connects the host devices 10 and storage devices 20 includes switches 51, cables 52, and other equipment, for example. The HBA 14 exchanges data between prescribed storage devices 20 via the switches 51 and the like.

The configuration of the storage device 20 will be described. A controller 21 may, for example, be provided with a plurality of channel adapters (CHA: Channel Adapter) 212, a plurality of disk adapters (DKA: DisK Adapter) 213, at least one or more shared memory (SM: Shared Memory) 214, at least one or more cache memory (CM: Cache Memory) 215, a switch (SW) 216, and a service processor (SVP: SerVice Processor) 217. The I/O processor 210 and relocation controller 211 shown in FIG. 1 are implemented by the collaboration between the CHAs 212 and DKAs 213, for example.

CHAs 212 control data movement between the host devices 10. The CHAs 212 can move data between different host devices 10. The CHAs 212 exchange control information or the like between other CHAs 212 and DKAs 213 via an SM 214.

First describing the operation of the DKA 213, when the CHAs 212 receive a read command from a host device 10, the read command is stored in the SM 214. The DKA 213 constantly refers to the SM 214, and when a unprocessed read command is discovered, data is read from the specified volume 220 and stored in the CM 215. The CHAs 212 read data moved to the CM 215 and send the data to the host devices 10.

When the CHAs 212 receive a write command from the host devices 10, the write command is stored in the SM 214. The CHAs 212 store the received write data in the CM 215. The CHAs 212 store the data in the CM 215 and thereafter reports to the host device 10 that writing has been completed. The DKA 213 reads the data stored in the CM 215 and stores the data in a prescribed volume 220 in accordance with the write command stored in the SM 214.

DKA 213 controls data communication between the disk drives 221. The DKAs 213 and the disk drives 221 are connected via an SAN or another communication network 23, and data is moved in block units in accordance with Fibre Channel Protocol. The DKAs 213 constantly monitor the state of the disk drives 221 and sends the monitoring results to the SVP 217.

CHAs 212 and DKAs 213 are provided with printed boards on which processors, memory, and other components are mounted, and with control programs (none of which are shown) stored in memory; and the prescribed functions are brought about by collaborative work between the hardware and software.

CM 215 stores data written by the host devices 10, data read by the host devices 10, and other data, for example. The CM 215 is composed of nonvolatile memory, for example. The SM 214 is composed of nonvolatile memory, for example. Control information, management information, and other types of information are stored in the SM 214. The control information and other types of information can be multiply managed by a plurality of SM 214. A plurality of SM 214 and CM 215 may be provided, and CM 215 and SM 214 may be mounted together on the same memory board. A portion of memory may alternatively be used as cache memory and the other portion used as control area.

SW 216 is connected to the CHAs 212, DKAs 213, SM 214, and CM215. All of the CHAs 212 and DKAs 213 can access the SM 214 and CM 215. The SW 216 can be configured as a cross-bus switch, for example.

The storage unit 22 can be disposed in the same or different case as the controller 21. A plurality of sets of a plurality of types of storage devices may be disposed in the storage unit 22. Examples of a storage device include a hard drive, semiconductor memory drive, and optical disk drive (including holographic devices). A hard drive is exemplified in this embodiment.

A plurality of disk drives 221, for example, may coexist in the storage unit 22. Examples of disk drives 221 that may be used include FC disks, SCSI (Small Computer System Interface) disks, SATA disks, and SAS (Serial Attached SCSI) disks. The type of disk is not limited to those listed above, and storage devices equivalent to the listed disk drives or storage devices that may be developed in the future may also be used.

A RAID group (also referred to as a parity group) 222 is formed by a prescribed number of disk drives 221, examples of which include four drives per group, three drives per group, and so forth. The RAID groups 222 may be composed of the same type of physical disk 221. More specifically, certain RAID groups 222 are exclusively composed of FC disks, and other RAID groups 222 are exclusively composed of SATA disks. The RAID group 222 is a storage area or a storage hierarchy for accommodating the volumes 220.

At least one or more logical volumes 220 can be accommodated in the storage areas provided by the RAID groups 222. Open-type host devices 10 can recognize and use the volumes 220 as physical storage devices by associating the logical volume with the LU (logical unit). The access target volume of an open-type host device 10 is the LU, and the access target of the mainframe-type host is the logical volume 220.

The RAID groups 222 can be set with different levels of storage redundancy. Examples of storage redundancy include RAID0, RAID1, RAID3, and RAID5.

RAID0 is a method that is also referred to as striping, whereby data is divided and dispersed to a plurality of disks for storage. RAID0 simply disperses the data, and cannot restore lost data. However, the dispersed data can be accessed in a parallel fashion. Redundancy is not provided at all in RAID0.

RAID1 is a method that is also referred to as mirroring, whereby the same data is written to a plurality of disks. In RAID1, since the same data is kept in different disks, if one of the disks fails, data can be processed using the other disk, and fault-tolerance is improved. However, costs increase because only half the total disk size can be used.

RAID3 is a method that divides data, disperses and writes the data to a plurality of data disks, and stores the parity generated from the divided data on a separate parity disk.

RAID5 is a method for dispersing and storing both data and parity in a plurality of disks. When data is updated, the data must then be written back to the disk after the old data and parity are read and a new parity is calculated, and so write access is lower in comparison with RAID1. With RAID5, however, since the data is dispersed together with parity without the use of a parity disk, write access can be carried out at relatively high speed. The storage capacity of the disks can be used efficiently and the cost is low because redundancy is assured.

With the storage device 20 a volume 220 whose access frequency had decreased can be moved to a lower-speed RAID group 222 on the basis of the storage-side data migration policy that has been set in advance. The movement method of a volume 220 that straddles storage areas (222) will be described later.

The storage resources used by the storage device 20 are not all required to be present within the storage device 20. The storage device 20 can incorporate and use storage resources of other storage devices that exist outside the storage device 20 as if they were its own storage resources.

The SVP 217 is connected to each CHA 212. For convenience in the diagram, the SVP 217 is connected to a single CHA 212 only, but in actual practice, the SVP 217 is connected to each CHA 212. The SVP 217 can access the SM 214 and other components via the CHA 212.

The SVP 217 is connected to the storage management terminal 70 via a LAN or another network. The storage management terminal 70 can log into a web server provided by the SVP 217, for example, and perform various settings to the storage device 20. The storage management terminal 70 is designed to acquire statuses or other information inside the storage device 20 via the SVP 217.

Figure 3:
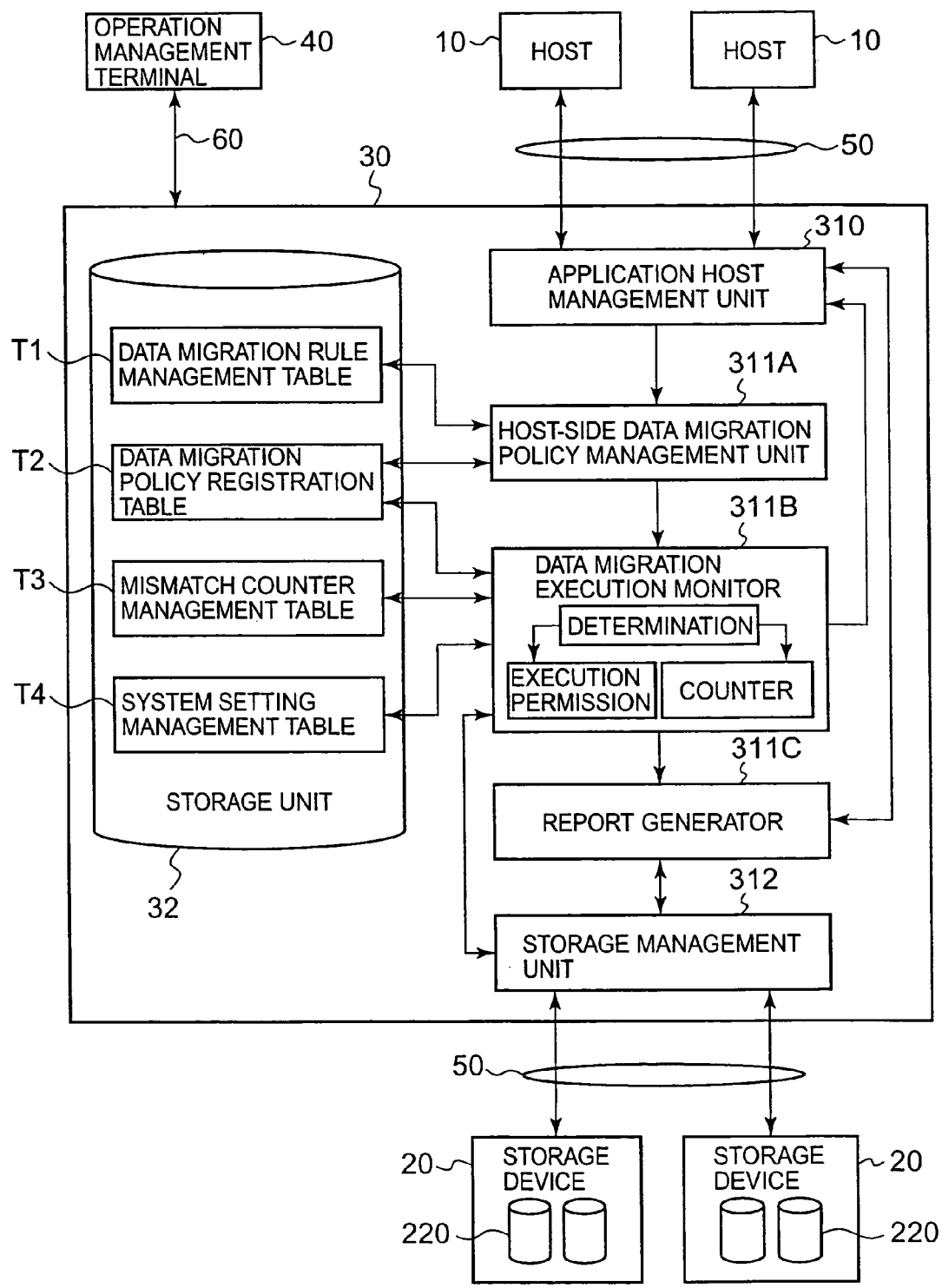
FIG. 3 is a block diagram showing the configuration of an operation management server.

FIG. 3 is a block diagram showing the configuration of the operation management server 30. A plurality of tables T1 to T4 are stored in the storage unit 32. The details of the tables will be described later, but the data migration rule management table T1 is a table in which the data migration method is specified in advance. The data migration policy registration table T2 is a table for managing the policy (or conditions) of the host devices 10 that use the volume 220 with regard to the movement of the volume 220. The mismatch counter management table T3 is a table for detecting and managing the content and frequency of mismatches when there is a mismatch between the data migration policy of the storage device 20 and the data migration policy of the host device 10. The system setting management table T4 is a table for managing the threshold for generating a report and notifying the host manager and/or the storage manager when the data migration policies between the host device 10 and the storage device 20 do not match.

The host-side data migration policy management unit 311A registers and manages the host-side data migration policy that is set based on the data migration rule management table T1 in the data migration policy registration table T2. The data migration policy can be set for each volume of the storage devices 20.

The data migration execution monitor 311B compares the data migration policy of the storage device 20 and the data migration policy of the host device 10 when a movement of the volume 220 is requested, and determines whether the policies match. When the policies match, the monitor 311B permits the movement of the volume. When the storage device 20 obtains approval from the monitor 311B, the movement destination volume is selected and other actions are carried out to move the volume. In contrast, when the policies do not match, the monitor 311B updates the mismatch counter management table T3 and records the points of differences in the policies and the number of mismatch occurrences.

Figure 4:
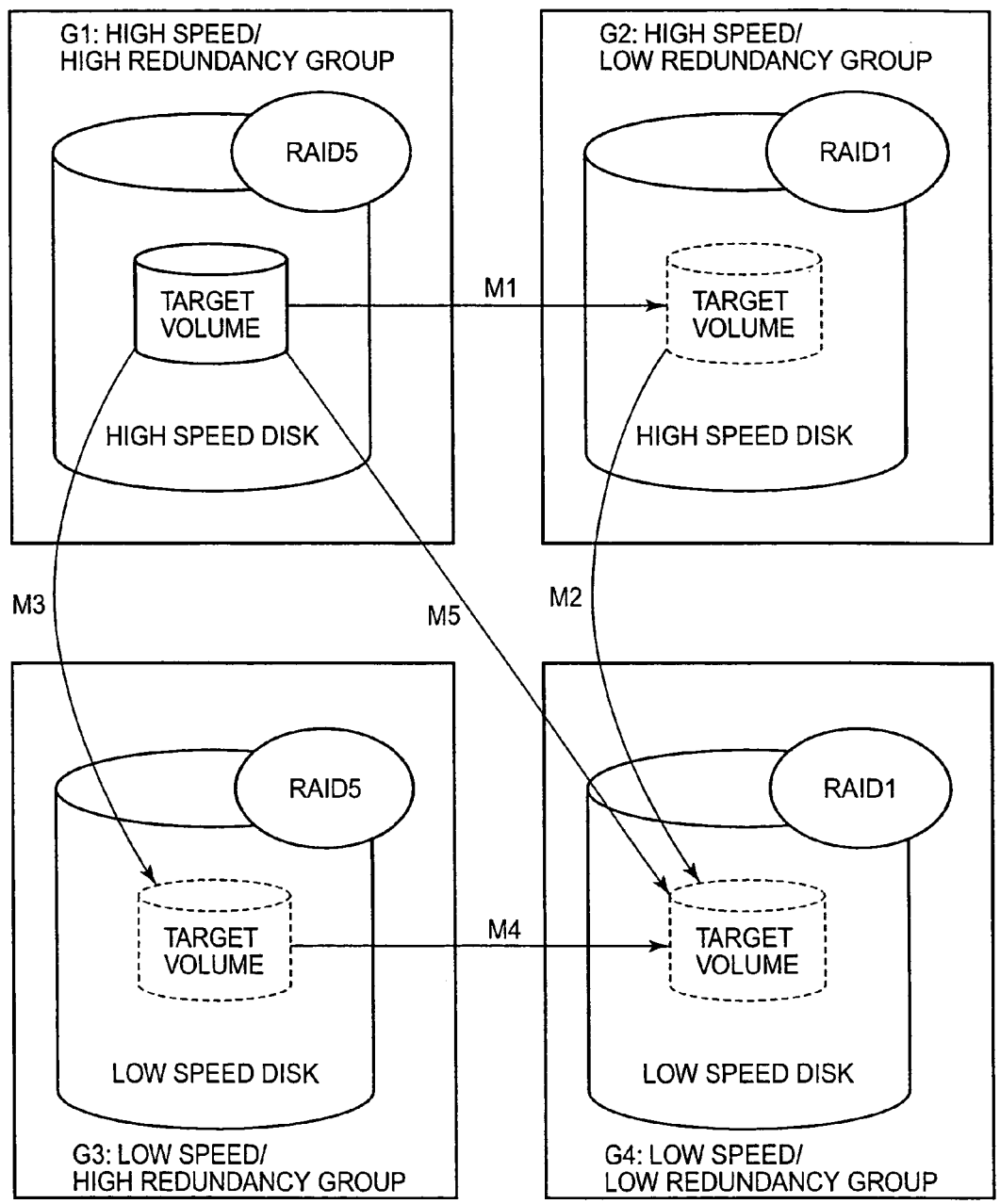
FIG. 4 is a diagram schematically showing the situation in which a volume is relocated among a plurality of storage layers (RAID Group), each with different attributes.

FIG. 4 is a diagram schematically showing the situation in which a volume is moved among a plurality of storage areas. As described above, the storage device 20 is provided with disk drives 221 having different characteristics, and different RAID levels can be set in the storage areas provided by the disk drives 221. The storage areas in the storage device 20 can be divided into a plurality of groups (categories) and classified by the characteristics and RAID level of the disk drives 221.

The access characteristics of the storage device are divided into the two types of high speed and low speed, for example, and when the storage devices are divided into two types of RAID levels such as low redundancy and high redundancy, the storage areas of the storage device 20 can be classified into a total of four groups.

The first group G1 is a "high-speed, high-redundancy group." The first group G1 is produced by structuring the storage areas provided by an FC disk or another high-speed device in a RAID5 configuration. The second group G2 is a "high-speed, low-redundancy group." The second group G2 is produced by structuring the storage areas provided by an FC disk or another high-speed device in a RAID1 configuration. The third group G3 is a "low-speed, high-redundancy group." The third group G3 is produced by structuring the storage areas provided by an SATA disk or another low-speed device in a RAID5 configuration. The fourth group G4 is a "low-speed, low-redundancy group." The fourth group G4 is produced by structuring the storage areas provided by an SATA disk or another low-speed device in a RAID1 configuration.

A volume frequently accessed by a host device 10 is placed in the first group G1, for example. The main volumes used by the host devices 10 are disposed in the first group G1.

When the value of the data stored in the volume decreases with the passage of time, the volume whose access frequency has decreased is moved by the storage device 20 moves from the first group G1 to the second group G2 (M1), for example. When the value of the data has further decreased, the storage device 20 can also move the volume from the second group G2 to the fourth group G4 (M2). The storage device 20 may alternatively move the volume whose data has been devalued from the first group G1 to the third group G3 (M3), or may move the volume from the third group G3 to the fourth group G4 (M4). The storage device 20 can also move the volume from first group G1 to the fourth group G4.

As described above, the storage device 20 can move the volumes among a plurality of types of storage areas G1 to G4. The storage device 20 can also move the same volume a plurality of times in accordance with the degree of decline in the value of the data. When the access frequency has increased, a volume placed in the fourth group G4 can be moved back to the first group G1.

FIG. 5 is a diagram showing the data migration rule management table T1 and the host-side data migration policy registration table T2. Describing the data migration rule management table T1 first, the table T1 is composed of rule IDs (IDentification) for identifying the rules and the specific content of the rules associated therewith.

Specific examples of the contents of the rules include whether it is possible to move a volume to a low-speed group, to move a volume to a high-speed group, to move a volume to a low redundancy group, and to move a volume to a high-redundancy group. In the example in FIG. 5, four elements constituted the rules, but the present invention is not limited thereby. When there are four types of constituent rules, the total number of combinations is 16 ($=2^4$).

Described next is the host-side data migration policy registration table T2. The table T2 may be configured by associating the volume ID for identifying each volume, the rule ID set in the volumes, and the automatic relocation information set in the volumes.

The volume ID is information for identifying each volume 220 in the storage system. In lieu of a volume ID, it is possible to provide a device ID for identifying each storage device 20. The rule ID is information for identifying a rule to be applied to the volume. The operation management server 30 can ascertain the content of the data migration policy of the host device 10 by referring to the data migration rule management table T1 on the basis of the rule ID.

Automatic relocation information is control information that shows whether data migration is permitted to be carried out automatically, and shows the conditions when automatic data migration is permitted. When automatic data migration is set to "prohibited," the storage device 20 cannot automatically move the volume. When a time such as "AM 3:00" or "PM 1:00" is set in the automatic relocation information, the storage device 20 can move the volume when the set time arrives.

However, even in cases in which automatic data migration is permitted, when the policy of the storage device 20 and the rule instructed by the host device 10 do not match, the volume is not moved as a result.

When automatic data migration is prohibited, the data can be moved by manual operation by the storage manager or another operator. However, even when the volume is moved by manual operation, the volume is prohibited from being moved when the policy of the storage device 20 and the rule instructed by the host device 10 do not match.

In the data migration rule management table T1 shown in FIG. 5, two factors, access performance and storage redundancy of the storage areas, are used and exemplified is the case in which each factor may assume one of two values, but the present invention is not limited thereby, and other factors may be adopted and each factor may assume one of three or more values. In the case of access performance, for example, three types of values, such as high speed, medium speed, and low speed, may be selected; and in the case of storage redundancy, three types of values, such as high redundancy, medium redundancy, and low redundancy, may be selected.

In addition to access performance and storage redundancy, or in lieu of either access performance or storage redundancy, other factors may also be adopted. Examples of other factors include the structural type of the storage device (hard disk, semiconductor memory, or the like), and the physical location of the storage device (in a local site, a remote site, or another site).

A configuration is also possible in which the rules are set with greater detail. Access performance may be set with more specific conditions such as "whether movement to an FC drive is permitted," "whether movement to a SATA drive is permitted," "whether movement to a SCSI drive is permitted," "whether movement to another drive is permitted," and so forth. In a similar manner, storage redundancy may be set with a more specific RAID level such as "whether movement to RAID0 is permitted," "whether movement to RAID1 is permitted," "whether movement to RAID3 is permitted," "whether movement to RAID4 is permitted," "whether movement to RAID5 is permitted," "whether movement to RAID6 is permitted," and so forth.

A contrasting configuration is also possible in which the rules related to the movement of volumes are set in a more readily apparent, more intuitive manner. Alternatives can be prepared in which intentions and goals related to the movement of volumes are easily specified even for a host manager who is not accustomed to storage systems, and examples of such directions include "prohibit movement that will render a volume more inconvenient," "accept some inconvenience in terms of a balance with other host devices," and "accept reduced access performance if a minimum level of redundancy is assured."

If the access performance, storage redundancy, and other factors and their values are associated in advance with the readily apparent alternatives, the intention of the host device 10 and the schedule of the storage device 20 with respect to the movement of the volume can be compared by internal routines of the operation management server 30.

As described in the present embodiment, the operation management server 30 can handle readily apparent alternatives even when the configuration of the storage device 20 has changed, by abstractly specifying the device type and the storage redundancy level without expressly specifying the disk type and RAID level as the host-side data migration policy. In other words, configurational changes in the storage device 20 can be handled without making significant changes to the operation management server 30, even when a new type of hard disk has been added to the storage device 20 or a new RAID level has been defined.

Figure 6:
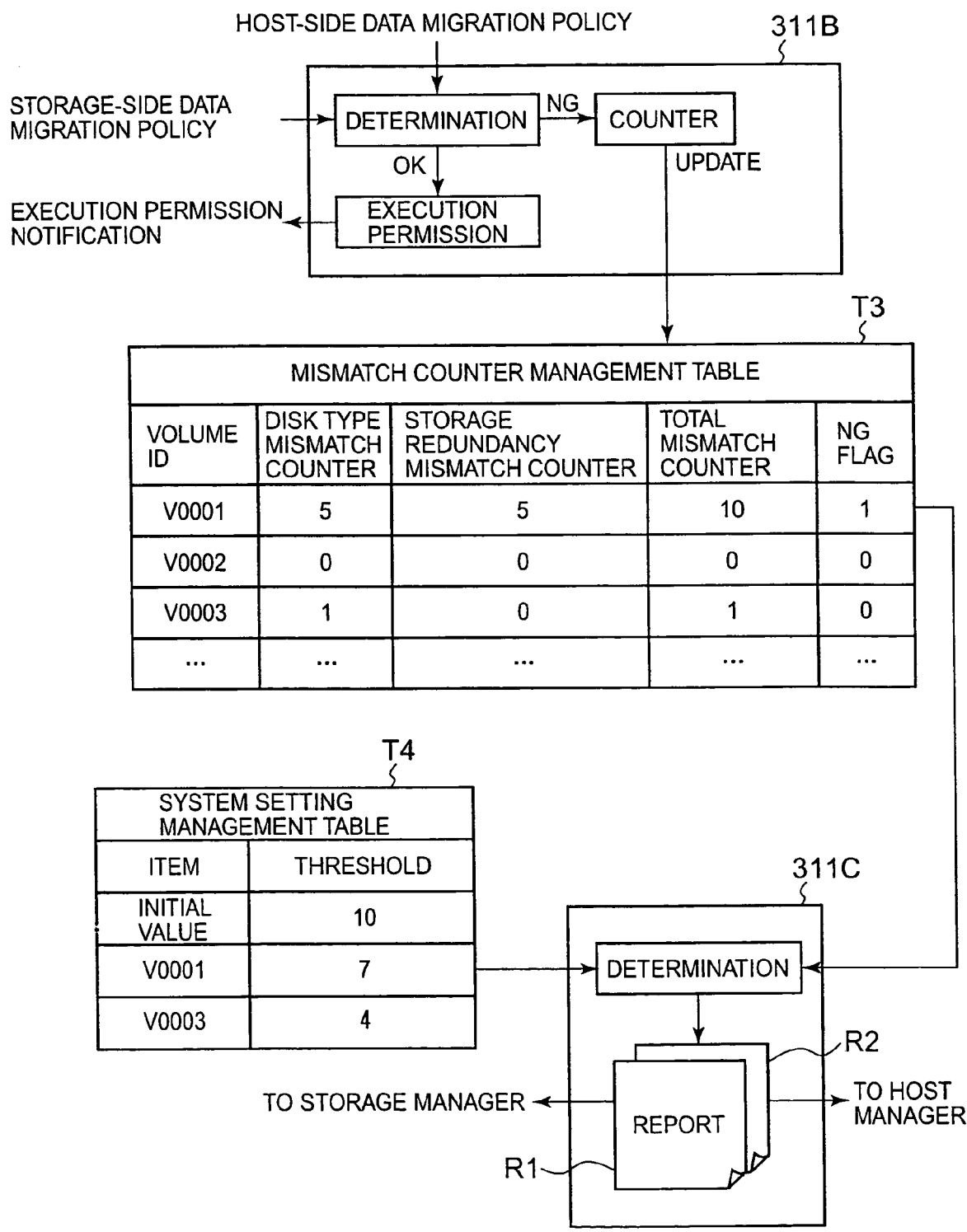
FIG. 6 is a diagram showing the configuration of a mismatch counter management table and a system setting management table, and the relationship between the tables.

FIG. 6 is a diagram showing the configuration and other aspects of a mismatch counter management table T3 and a system setting management table T4.

The mismatch counter management table T3 is designed to record the content of mismatches and to count the number of times that mismatches occur when the data migration policy (rule ID and automatic relocation information) set by the host device 10 in advance and the storage-side data migration policy acquired from the storage device 20 do not match.

The mismatch counter management table T3 may be configured by associating the volume ID, the disk type mismatch counter, the storage redundancy mismatch counter, the total mismatch counter, and the NG flag.

As used herein, the term "disk type mismatch counter" refers to a component that detects the number of times there is a mismatch between the disk type permitted by the rules set by the host device 10 and the disk type of the planned destination of the movement acquired from the storage device 20. In a similar fashion, the term "storage redundancy mismatch counter" refers to a component that detects the number of times there is a mismatch between the storage redundancy permitted by the rules set by the host device 10 and the storage redundancy of the planned destination of the movement acquired from the storage device 20. The term "total mismatch counter" refers to a component that totals the value of the disk type mismatch counter and the value of storage redundancy mismatch counter.

The NG flag is control information for determining whether a report should be sent to the host manager and storage manager. When the value of the total mismatch counter has reached a prescribed threshold that is applied to the volume, the NG flag is set to "1." When the report is sent, the NG flag and the value of the mismatch counters can be reset to "0."

The system setting management table T4 manages the threshold that is applied to the volumes. The system setting management table T4 can manage the initial value applied commonly to all volumes, and the separate threshold values applied exclusively to specific volumes. The separate threshold values are applied with priority given to the initial value.

As shown in FIG. 6, the monitor 311B compares the policy of the host device 10 and the policy of the storage device 20, and when the policies match, data migration by the storage device 20 is allowed to be carried out. When the policies do not match, the monitor 311B updates the mismatch counter management table T3. The monitor 311B sets the NG flag in the volume in which the value of the total mismatch counter has reached a prescribed threshold.

When the NG flag has been set, the report generator 311C generates reports R1 and R2 concerning the movement of the volume. The storage manager report R1 is sent to the storage manager, and the host manager report R2 is sent to the host manager. The reports R1 and R2 are created and sent in a format such as email.

The report R1 may be sent to the storage device 20 or the storage management terminal 70, and the report R2 may be sent to the host device 10. The reports may alternatively be sent to a mobile information terminal (including mobile telephones) in possession of each manager. The destination of the report and the notification that a report has been generated may be separated, and the report generation notification may be sent to a mobile information terminal in possession of each manager.

Figure 7:
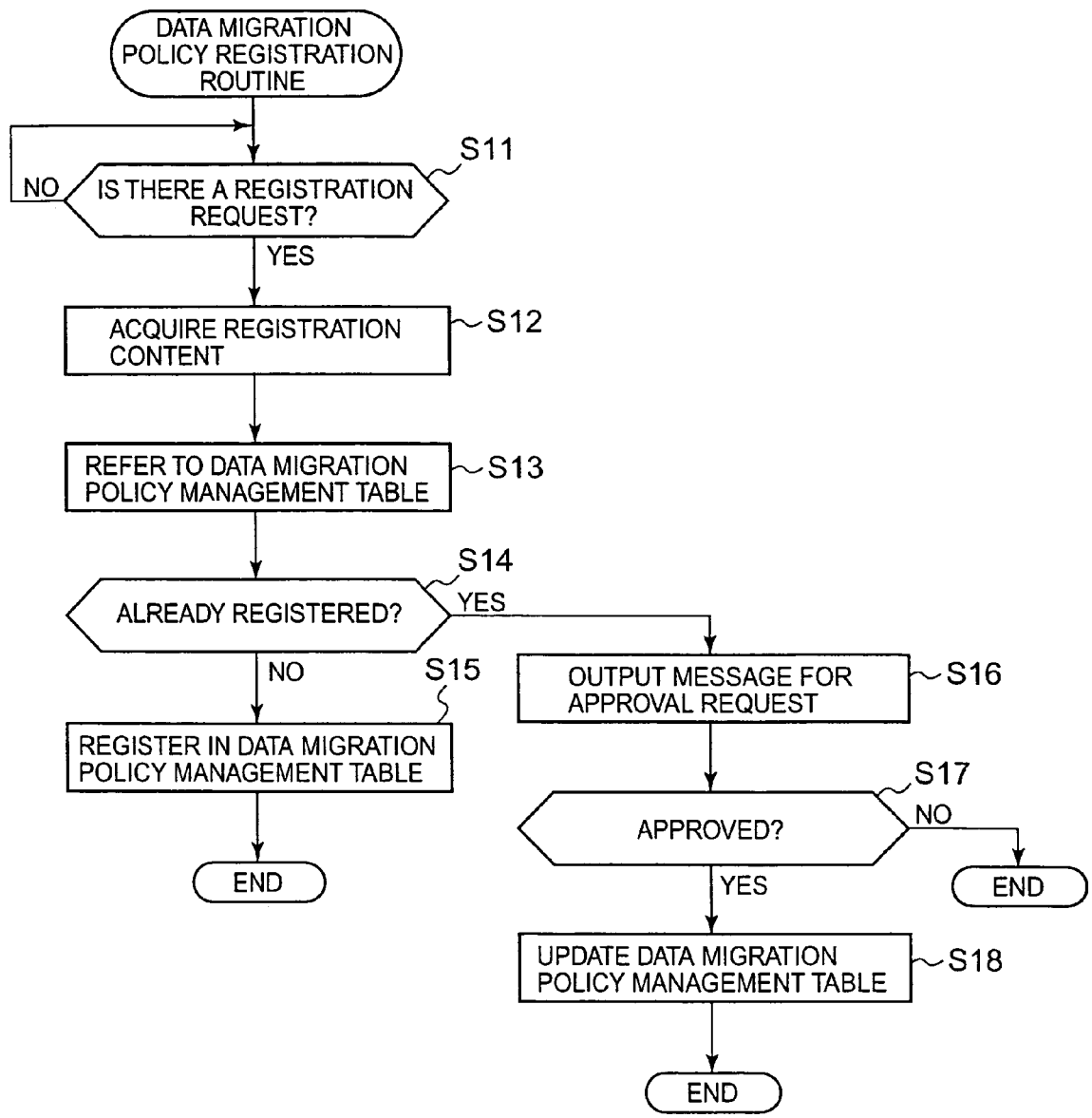
FIG. 7 is a flowchart showing the routine for registering host-side data migration policy.

FIG. 7 is a flowchart showing an outline of the routine for registering host-side data migration policy in the operation management server (may also be referred to hereinafter as "management server") 30. The management server 30 determines whether a request to register a host-side policy has been generated (S11). The registration request can be performed by the operation management terminal 40, for example, and the host device 10 may also carry out such a request.

When a registration request has been generated (S11: YES), the operation management server 30 acquires the content of the requested registration (S12). The registration content includes the volume ID for identifying the target volume, the rule ID for identifying the rule applied to the volume, and whether automatic relocation is permitted, as shown in the host-side data migration policy registration table T2 in FIG. 5.

The operation management server 30 refers to the table T2 (S13) and determines whether the policy has already been registered for the volume for which registration has been requested (S14). When the volume has not been registered in the table T2 (S14: NO), the management server 30 registers the specified registration content in the table T2 (S15).

Conversely, when a policy has already been registered for a volume for which a policy registration is being requested (S14: YES), the management server 30 outputs a message requesting overwrite approval (S16) and waits for approval from the host manager (S17). If the host manager approves the policy overwrite (S17: YES), the management server 30 overwrites the requested registration content in the table T2 (S18). When approval is not obtained from the host manager (S17: NO), the present routine is ended. A request to register the host-side data migration policy can be generated again if the host manager so desires.

Figure 8:
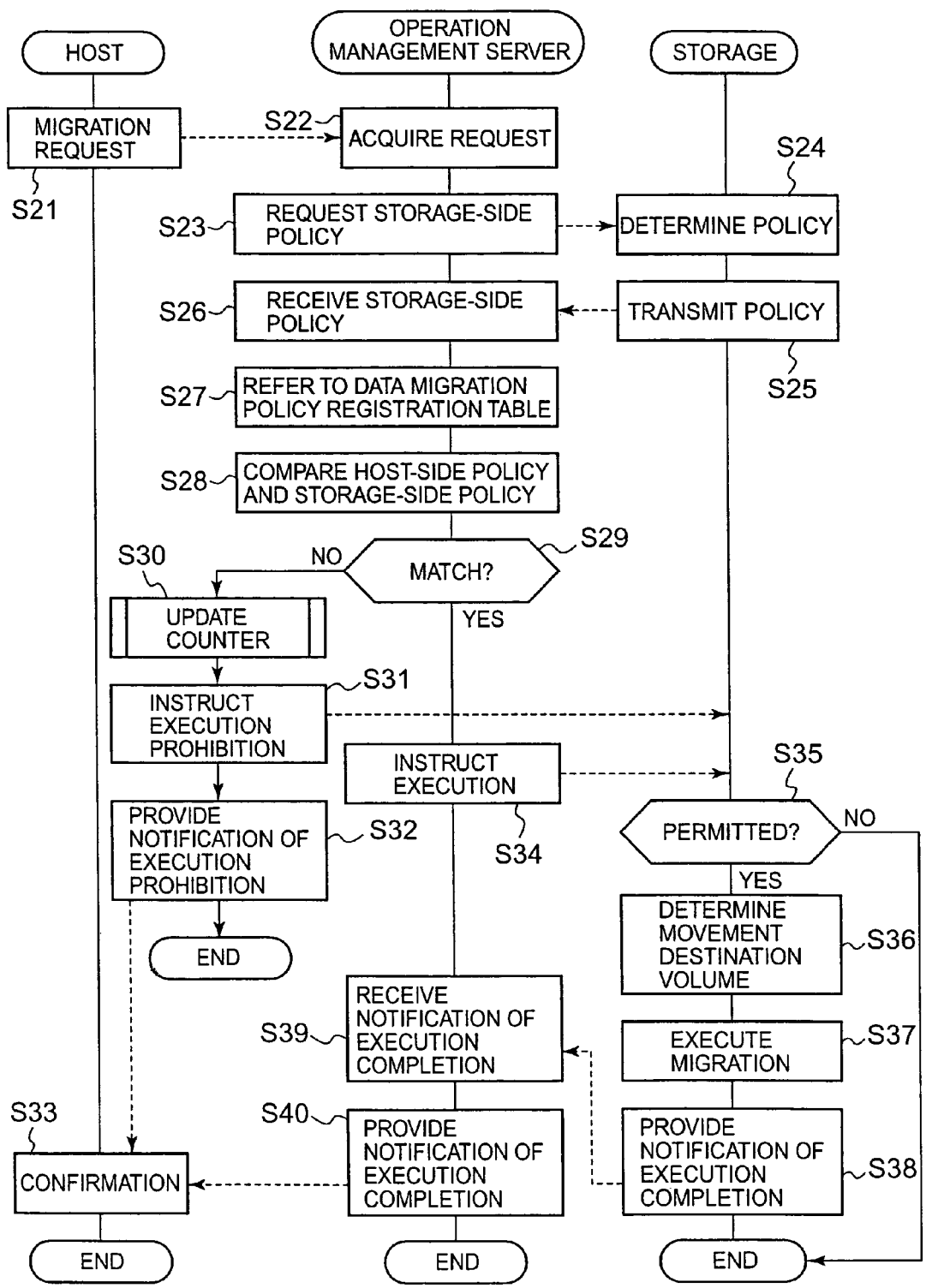
FIG. 8 is a flowchart showing the overall processing of data migration.

FIG. 8 is a flowchart showing an outline of the overall processing of data migration. In this example, the host side requests that data migration be initiated (S21), but it is also possible for the storage side to request that data migration be initiated, as described later.

When the management server 30 acquires the request to initiate data migration (S22), the server requests from the storage device 20 the storage-side data migration policy for the movement target volume (S23). The storage device 20 determines the policy that should be applied to the volume by detecting the access frequency and the like for the volume indicated by the management server 30 (S24). The storage device 20 sends the determined policy to the management server 30 (S25). The policy determination routine in the storage device 20 is described later.

When the management server 30 acquires the storage-side policy (S26), the server refers to data migration policy registration table T2 (S27) and compares the host-side policy and the storage-side policy (S28). When the management server 30 determines that the policies do not match (S29): NO), the mismatch counter management table T3 is updated (S30). The management server 30 notifies the storage device 20 and the host device 10 that the movement of the volume is prohibited (S31 and S32). The host device 10 can confirm that data migration has been prohibited by notification from the management server 30 (S33).

When the host-side policy and the storage-side policy match (S29: YES), the management server 30 permits the movement of the volume (S34). In other words, the management server 30 directs that the data migration be carried out.

The storage device 20 determines whether the execution of the data migration is permitted by the management server 30 (S35). If permitted (S35: YES), the management server 30 determines (S36) the volume of the movement destination on the basis of the storage-side policy determined in S24, and carries out the data migration (S37).

More specifically, the movement destination volume with the same size as the movement origination volume 220 is set in the selected RAID group 222, and the data is copied from the movement origination volume to the movement destination volume. When copying between the volumes is complete, the storage device 20 notifies the management server 30 that the data migration has been completed (S38). When the management server 30 has prohibited data migration, the processing the storage device 20 is ended.

When the management server 30 receives notification from the storage device 20 that execution has been completed (S39), the server notifies the host device 10 that the data migration has been completed (S40). The host device 10 can confirm by notification from the management server 30 that the data migration has been completed normally (S33).

The routine for comparing the host-side policy and the storage-side policy, and the routine for updating the mismatch counter will be described later.

As described above, the storage device 20 first determines the data migration policy (S24), and when the permission to execute data migration is obtained from the management server 30 (S35: YES), the storage device determines the details of the data migration (S36).

However, no limitation is imposed thereby, and the storage-side policy may be generated in a state in which the movement destination volume has been identified or secured. That is to say, there are a plurality types of methods for configuring the storage-side data migration policy sent by the storage device 20 to the management server 30. A first method is a method that includes in the storage-side policy only the attributes (disk type and RAID level) of the RAID group 222 of the planned movement destination, as described together with FIG. 8. A second method is a method that includes, in addition to the attributes of the RAID group 222 of the planned movement destination, the ID and the like of the movement destination volume.

Figure 9:
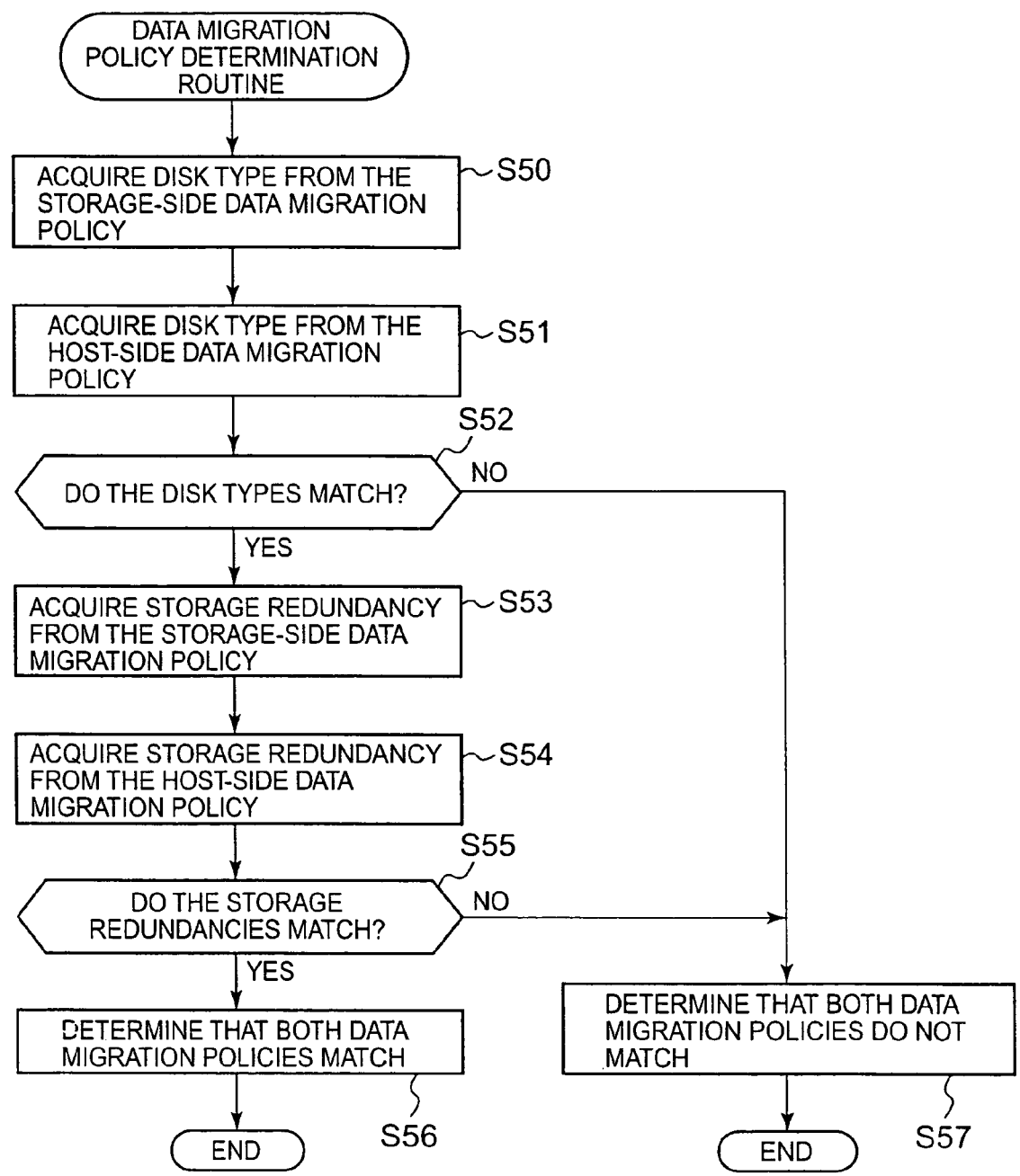
FIG. 9 is a flowchart showing the routine for determining whether the host-side data migration policy and the storage-side data migration policy are congruent.

FIG. 9 is a flowchart showing the routine for determining whether the host-side policy and the storage-side policy match, and corresponds to S28 and S29 in FIG. 8.

First, the management server 30 acquires the disk type from the storage-side policy received from the storage device 20 (S50) and acquires the disk type from the host-side policy (S51). The management server 30 determines whether disk types contained in the policies match (S52). When the disk types match (S52: YES), the system examines the storage redundancy (S53 to S55). When the disk types do not match (S52: NO), the management server 30 determines that the host-side policy and the storage-side policy do not match (S57).

When the disk types match (S52: YES), the management server 30 acquires the storage redundancy from the host-side policy and the storage-side policy (S53 and S54), and determines whether the storage redundancies match (S55).

When the storage redundancies match (S55: YES), the management server 30 determines that the host-side and storage-side policies match (S56). This is because the disk types and storage redundancies match. Contrary to this situation, when the storage redundancies do not match (S55: NO), the management server 30 determines that the host-side and storage-side policies do not match (S57).

The term "match" between the disk types and storage redundancies also refers to an essential match. In other words, it may be determined that the content of the disk types and the storage redundancies contained in both policies match when the there is no mutual clash or contradiction.

When priority levels are set for the factors (disk type, storage redundancy) to be compared, and the factors set with a high priority match, it is possible to determine that the host-side and storage-side policies essentially match, even if factors set with a low priority do not match.

Figure 10:
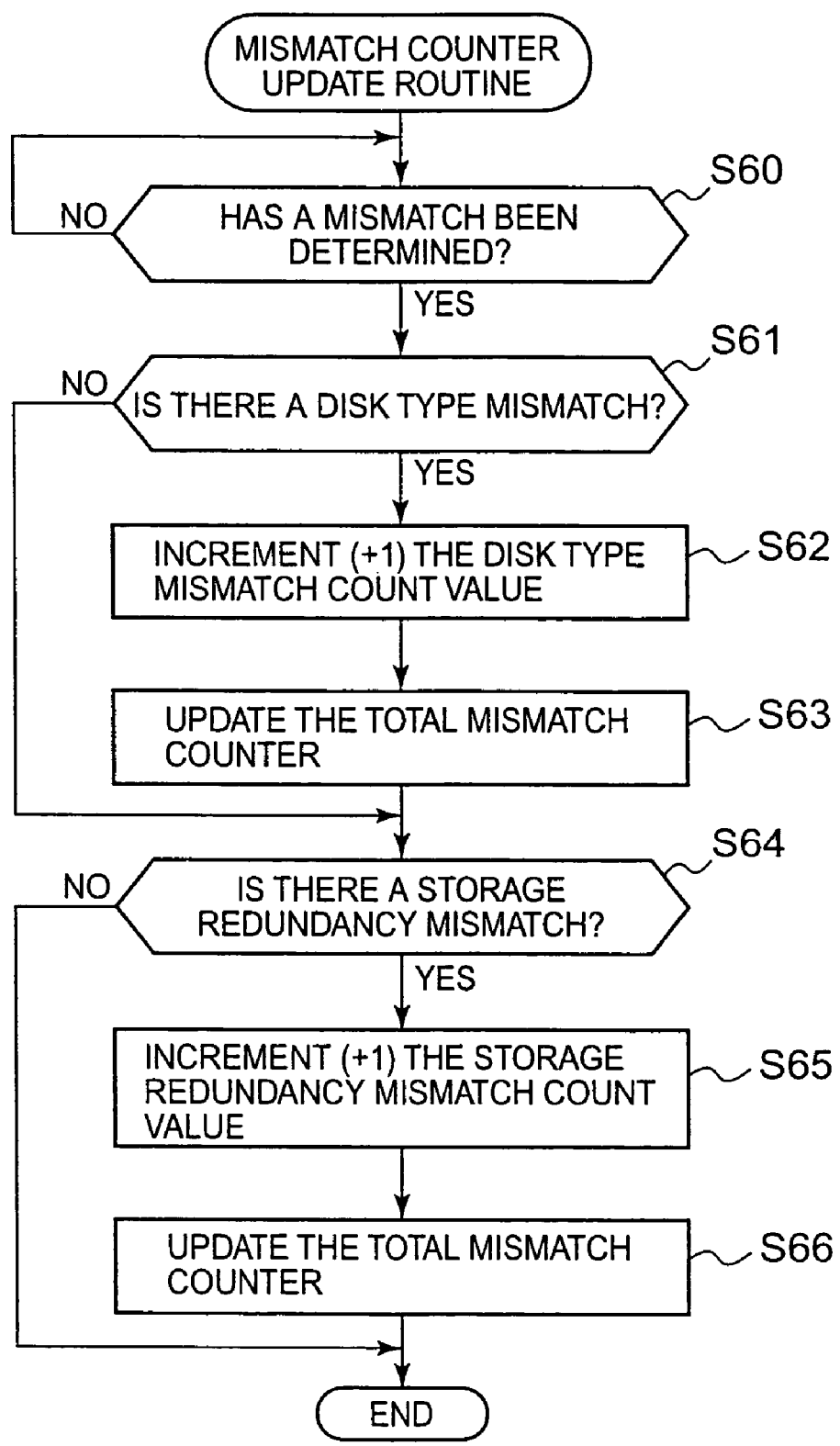
FIG. 10 is a flowchart showing the routine for updating the mismatch counter.

FIG. 10 is a flowchart that shows the routine for updating the mismatch counter management table T3, and corresponds to S30 in FIG. 8.

When the management server 30 determines that the host-side and storage-side policies do not match (S60: YES), a determination is made as to whether the cause of the mismatch is a difference of disk types (S61).

When the policies do not match due to a difference in disk types (S61: YES), the management server 30 increments by 1 the value of the disk type mismatch counter in the mismatch counter management table T3 (S62). The management server 30 then updates the value of the total mismatch counter (S63).

When the disk type is the cause of mismatch of policies, in other words, when the disk type of the host-side policy and the disk type of the storage-side policy do not match (S61: NO), the steps S62 and S63 are skipped, and the management server 30 determines whether the storage redundancies contained in the polices are different (S64). When the storage redundancies are different (S62: YES), the management server 30 increments by 1 the value of the storage redundancy mismatch counter in the mismatch counter management table T3 (S65). The management server 30 then updates the value of the total mismatch counter (S66).

Figure 11:
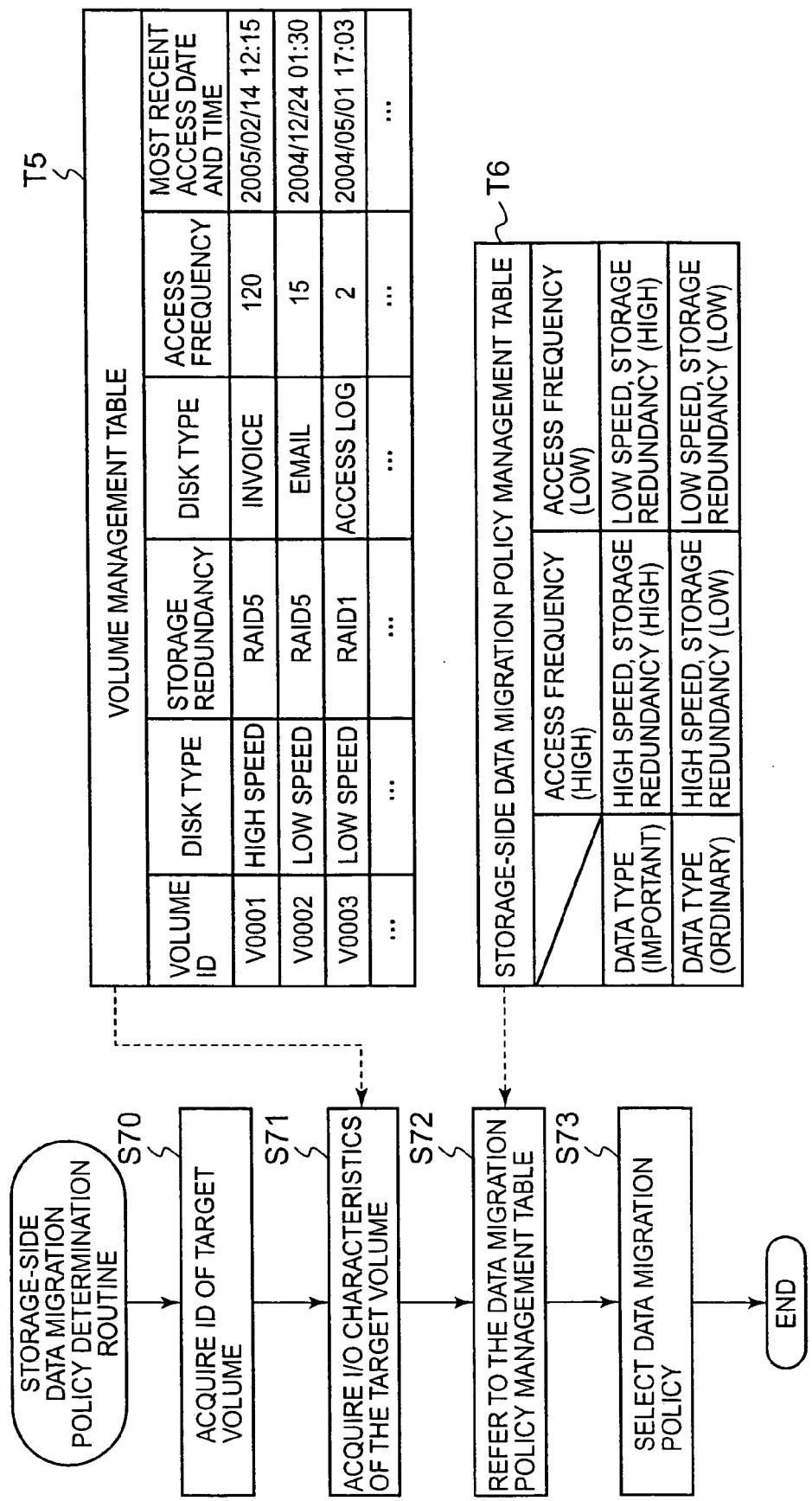
FIG. 11 is a flowchart showing the routine in which the storage device determines the data migration policy.

FIG. 11 is a flowchart that shows the routine for determining the storage-side data migration policy, and corresponds to S24 in FIG. 8.

The storage device 20 acquires from the management server 30 the volume ID that identifies the movement target volume (S70), refers to the volume management table T5 on the basis of the volume ID, and acquires the I/O characteristics of the movement target volume (S71).

The volume management table T5 is a table for managing the state of all the volumes under the management of the storage device 20. The table T5 can be configured, for example, by associating the volume ID, the disk type constituting the volume, the storage redundancy that is set in the volume, the data type of the volume, the access frequency of the volume, the date and time of the most recent access to the volume, and other factors.

The term "disk type" refers to the type disk drive 221 constituting the RAID group 222 in which the volume 220 is set. The term "storage redundancy" refers to the RAID level of the RAID group 222 in which the volume 220 is set. The term "data type of the volume" refers to the type (or characteristics) of data stored in the volume. The term "I/O characteristics" refers to the state and characteristics of access to the volume, for example.

The storage device 20 acquires from the table T5 information related to I/O characteristics such as data type and access frequency (S71), and refers to the storage-side data migration policy management table T6 (S72).

The storage-side data migration policy management table T6 determines the RAID group 222 of the movement destination by using the data type and access frequency, for example. When, for example, the data type is classified into the two types of "important" and "ordinary," and access frequency is classified into the two types of "high" and "low," these factors can be combined to obtain a total of four patterns.

The data can be determined to be important or not by endowing in advance the data types with attributes for distinguishing between "important" or "ordinary." Alternatively, the retention time assigned to the data and a prescribed threshold are compared and data with an assigned retention time that exceeds the prescribed threshold can be determined to be "important data."

When the movement target volume has the pattern "data type: important, access frequency: high," a RAID group having the attributes "high speed, high redundancy" is selected as the movement destination RAID group of the volume.

When the movement target volume has the pattern "data type: important, access frequency: low," a RAID group having the attributes "low speed, high redundancy" is selected as the movement destination RAID group of the volume.

When the movement target volume has the pattern "data type: ordinary, access frequency: high," a RAID group having the attributes "high speed, low redundancy" is selected as the movement destination RAID group of the volume.

When the movement target volume has the pattern "data type: ordinary, access frequency: low," a RAID group having the attributes "low speed, low redundancy" is selected as the movement destination RAID group of the volume.

Thus, the storage device 20 can determine by referring to the table T6 the movement destination RAID group to which the movement target volume is to be moved (S73). In lieu of either the data type and access frequency, or in addition thereto, also possible is a configuration in which the movement destination RAID group is determined with consideration given to the file size stored in the volume.

Figure 12:
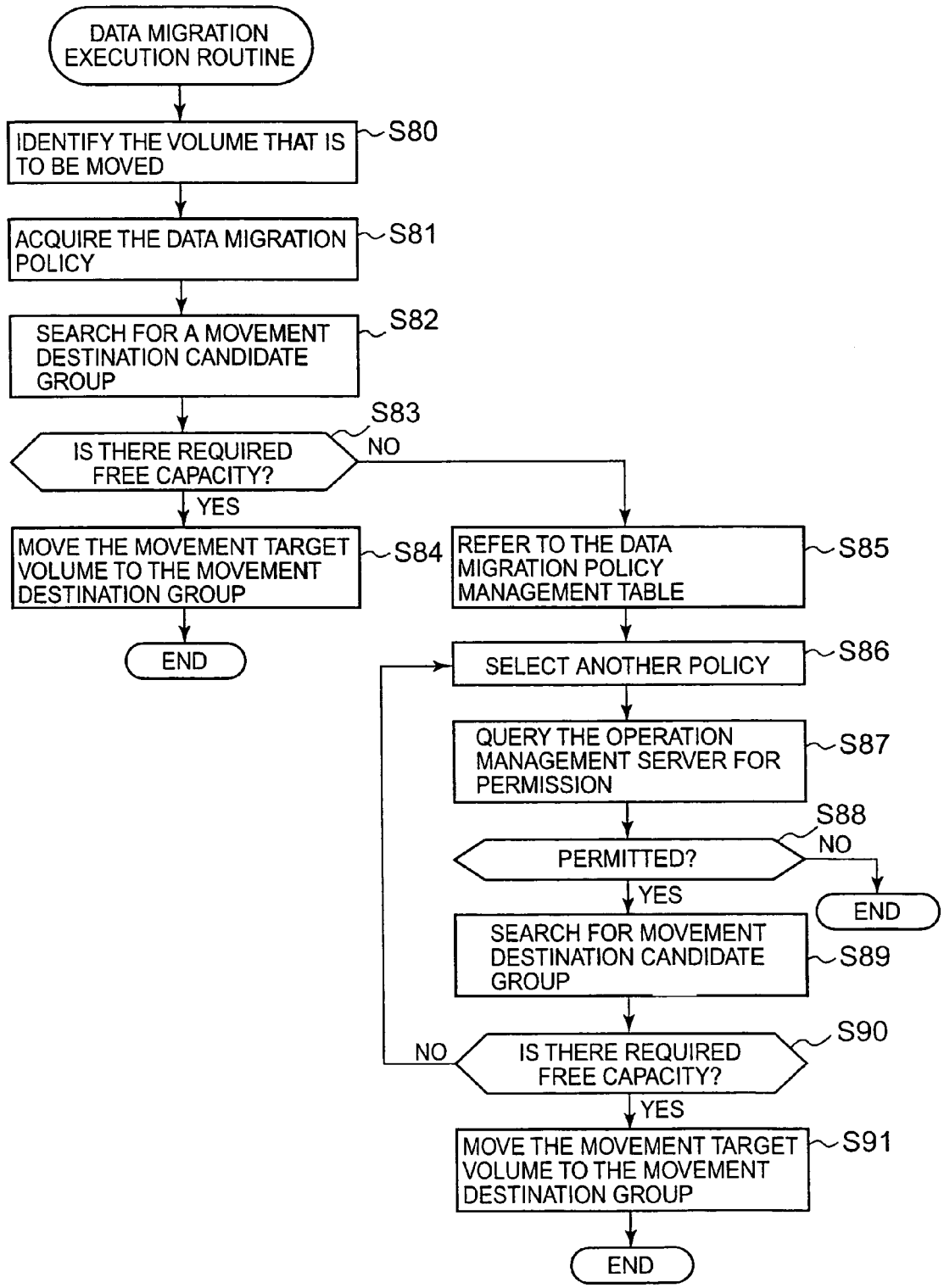
FIG. 12 is a flowchart showing the routine in which the data migration is carried out by the storage device.

FIG. 12 is a flowchart that shows the routine in which the data migration is carried out by the storage device 20, and corresponds to steps S36 and S37 in the FIG. 8.

The storage device 20 identifies the movement target volume by the volume ID (S80), and acquires the storage-side data migration policy determined by the routine in FIG. 11 (S81).

The storage device 20 searches for a RAID group 222 that matches the storage-side policy (S82), and determines whether there is required free capacity in the RAID group 222 that is the detected movement destination candidate (S83). When the free capacity in the movement destination candidate RAID group 222 is equal to or greater than the volume size of the movement origination volume (S83: YES), the storage device 20 generates a movement destination volume with the same size as the movement origination volume in the RAID group 222 selected as the movement destination, and copies the storage content of the movement origination volume to the movement destination volume (S84).

When there is not sufficient free capacity in the RAID group 222 of the movement candidate destination (S83: NO), the storage device 20 refers to the storage-side data migration policy management table T6 (S85) and selects another storage-side policy (S86).

For instance, when there is no free capacity in the initially selected "low-speed, low-redundancy RAID group," another RAID group is selected, such as a "low-speed, high-redundancy RAID group," or a "high-speed, low-redundancy RAID group."

The storage device 20 notifies the management server 30 of the change in the storage-side policy and queries permission to carry through with the change (S87). The management server 30 executes the policy determination routine described together with FIG. 9, determines whether the modified storage-side policy is permitted, and notifies the storage device 20 of the determination result.

The storage device 20 determines whether the modification to the storage-side policy is permitted by the management server 30 (S88). When the policy modification is permitted by the management server 30 (S88: YES), that is to say, when the modified storage-side policy instructs that the data migration be carried out, the storage device 20 searches the RAID group 222 of the movement candidate destination on the basis of the modified storage-side policy (S89).

The storage device 20 determines whether there is required free capacity in the searched RAID group 222 (S90). When the required free capacity is available (S90: YES), the storage device 20 generates a movement destination volume in the RAID group, and copies the storage content of the movement origination volume to the movement destination volume (S91).

If the required free capacity does not exist in the RAID group 222 detected based on the modified storage-side policy (S90: NO), the storage device 20 can again modify the storage-side policy (S86), and the management server 30 can be queried for approval (S87). When the management server 30 does not permit a modification of the storage-side policy (S88: NO), data migration is not carried out and the routine ends.

Figure 13:
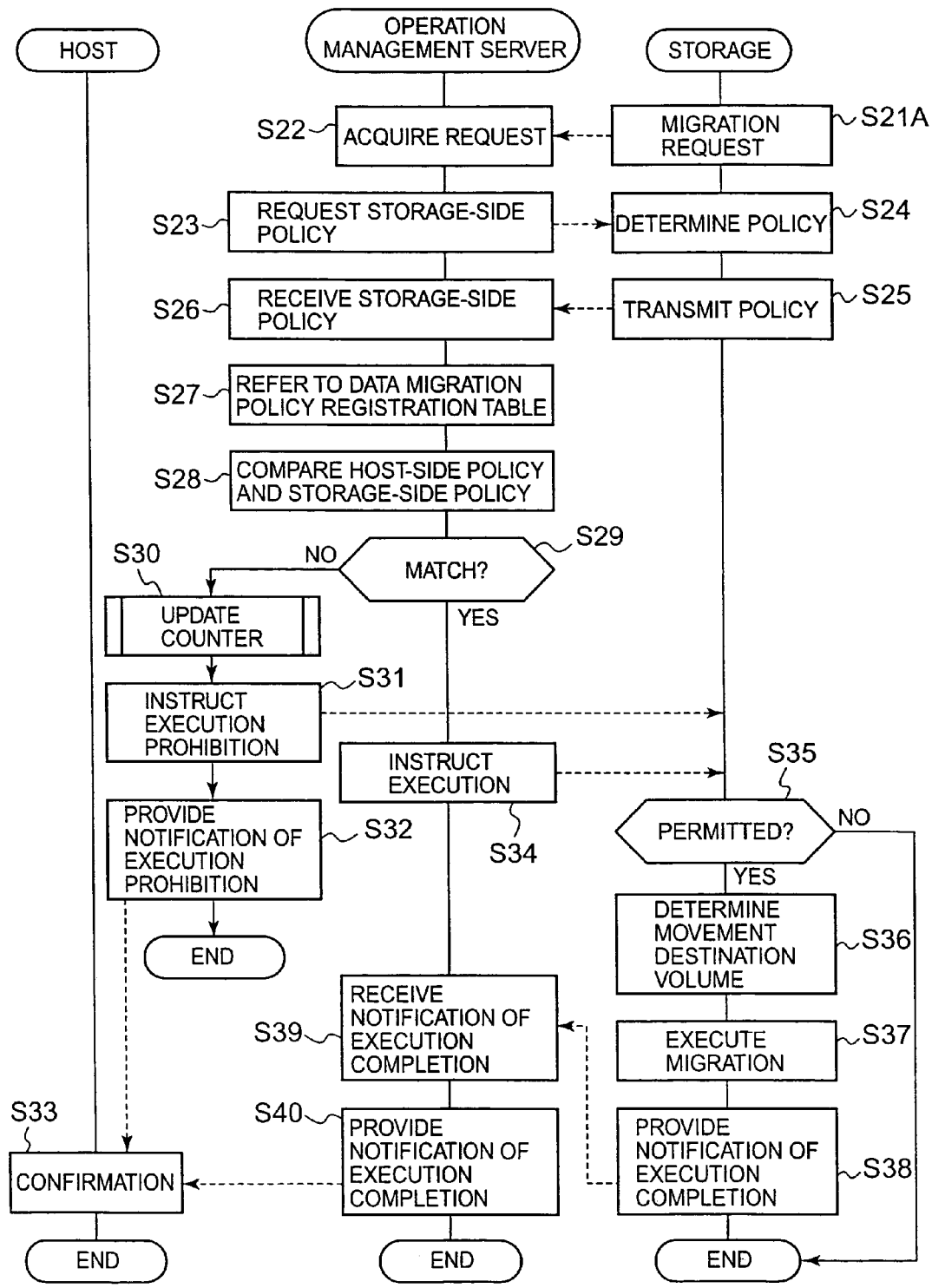
FIG. 13 is a flowchart showing a modified example of data migration processing.

FIG. 13 is a flowchart that shows an outline of the overall operation of the storage system, and corresponds to a modified example of the flowchart shown in FIG. 8. The storage device 20 may also request that data migration be started (S21A).

Figure 14:
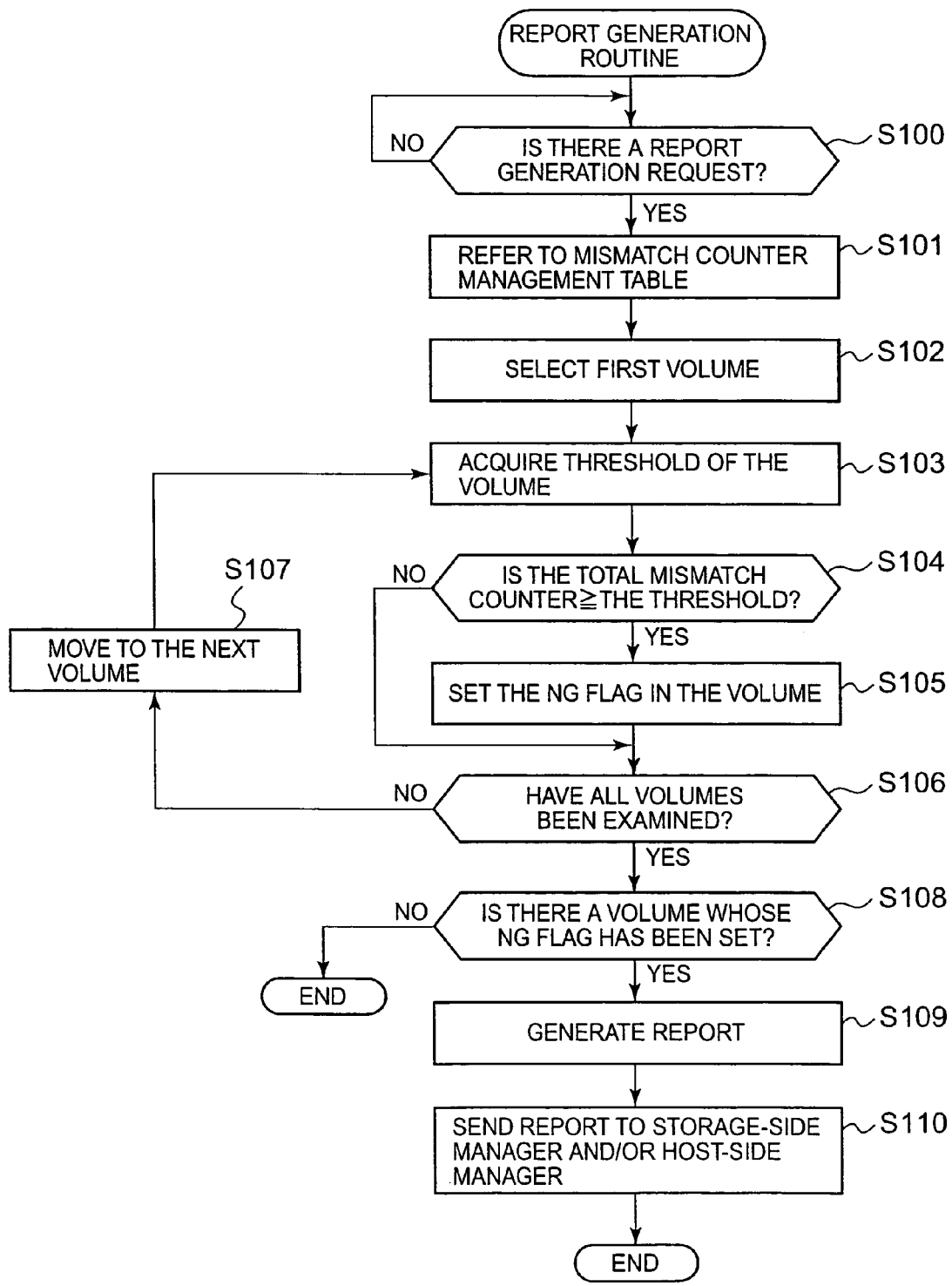
FIG. 14 is a flowchart showing the routine for generating a report that is sent to the manager.

FIG. 14 is a flowchart showing the routine for generating a report. The management server 30 monitors whether a request has been made to generate a report (S100). The report generation request can be made by the host device 10 or the storage device 20.

When the management server 30 detects a report generation request (S100: YES), the server refers to the mismatch counter management table T3 (S101) and selects the first volume registered in the table T3 (S102). The management server 30 then refers to the system setting management table T4 and acquires the threshold to be applied to the volume (S103). The management server 30 compares the threshold and the value of the total mismatch counter of the volume and determines whether the value of the total mismatch counter is equal to or greater than the threshold (S104).

When the value of the mismatch counter of the volume is equal to or greater than the threshold (S104: YES), the management server 30 sets the NG flag in the volume (S105). When the value of the mismatch counter of the volume is less than the threshold (S104: NO), the management server 30 skips step S105.

The management server 30 repeats the routine described in steps S103 to S105 while moving through the volumes to be examined (S107) until all the volumes registered in the mismatch counter management table T3 have been examined (S106).

When all the volumes have been examined to determine whether the NG flag is set (S106: YES), the management server 30 refers to the mismatch counter management table T3 and determines whether there is a volume in which the NG flag has been set (S108). When there is a volume in which the NG flag is set (S108: YES), the management server 30 creates a report of the volume in which the NG flag is set (S109) and provides a notification of the generated report to the storage manager and/or the host manager (S110).

The routine for setting the NG flag (S101 to S107) can be executed with the update routine of the mismatch counter described together with FIG. 10. The routine of steps S101 to S107 can be executed immediately after step S63 and immediately after step S66 in FIG. 10, for example. In this case, the report generation routine is composed of steps S100, and S108 to S110.

FIG. 15 is a diagram showing an example of the report generated by the management server 30. In the report R1 for the storage manager, it is possible to display the volume ID of the volume causing a problem with respect to data migration, and the content thereof, for example. The content of the problem related to data migration can be obtained from the mismatch counter management table T3.

Items that can be included in this report R1 are a message providing notification that data migration cannot be carried out (problem occurrence notification), message urging a review (correction) of the storage-side policy (correction request notification), and a message recommending consultation with the host manager (advice notification).

In a similar fashion in the report R2 for the host manager, it is possible to display the volume ID of the volume causing a problem with respect to data migration, and the content thereof, for example. The content of the problem related to data migration can be obtained from the data migration policy registration table T2. Items that can be included in the report R2, in a similar fashion to report R1, are a message providing notification that data migration cannot be carried out (problem occurrence notification), message urging a review (correction) of the host-side policy (correction request notification), and a message recommending consultation with the storage manager (advice notification).

The storage content of the mismatch counter management table T3 with respect to the volume for which data migration is prohibited, and the content of the host-side policy with respect to the volume may also be included in the reports R1 and R2.

The storage manager and the host manager can have an opportunity to review the data migration policies thereof by receiving reports R1 and R2 from the management server 30. A more suitable operation method for data migration can be considered when the storage manager and the host manager exchange opinions on the basis of the reports R1 and R2.

The present embodiment with the above-described configuration provides the following effects. In the present embodiment, the management server 30 determines whether both the host-side data migration policy directed by the host device 10 and the storage-side migration policy determined by the storage device 20 are congruent, and when the policies are congruent the autonomous movement of the volume by the storage device 20 is permitted. The specific individual situation of the host device 10 can thereby be reflected in the data migration carried out by the storage device 20, and the convenience of the storage system is improved.

In the present embodiment, when the data migration policy of the host device 10 and the data migration policy of the storage device 20 are not congruent, reports R1 and R2 are generated and the storage manager and/or the host manager are notified. The managers can therefore be given the opportunity to review the data migration policies and to exchange opinions, and the convenience of the system is improved.

In the present embodiment, the host-side data migration policy can be registered in the management server 30 before the data migration is carried out by the storage device 20. Data migration that reflects the intentions of the host side can therefore be carried out by the storage device 20 even when the host device 10 is stopped due to maintenance or a fault, for example.

Contrary to this situation, it is also possible to consider acquiring the host-side data migration policy from the host device 10 when the storage device 20 attempts to execute data migration. In this case, however, when the host device 10 is stopped, the desires of the host side cannot be reflected in the data migration carried out by the storage device 20. The execution of the data migration is alternatively delayed until the host device 10 recovers. However, the scope of the present invention includes a configuration in which the host-side policy is first acquired when such data migration is carried out.

In the present embodiment, when the storage-side policy is refused by the management server 30, another storage-side policy is selected and approval queried (S90: NO, proceed to S86). The possibility of executing the data migration is therefore increased.

Embodiment 2

Figure 16:
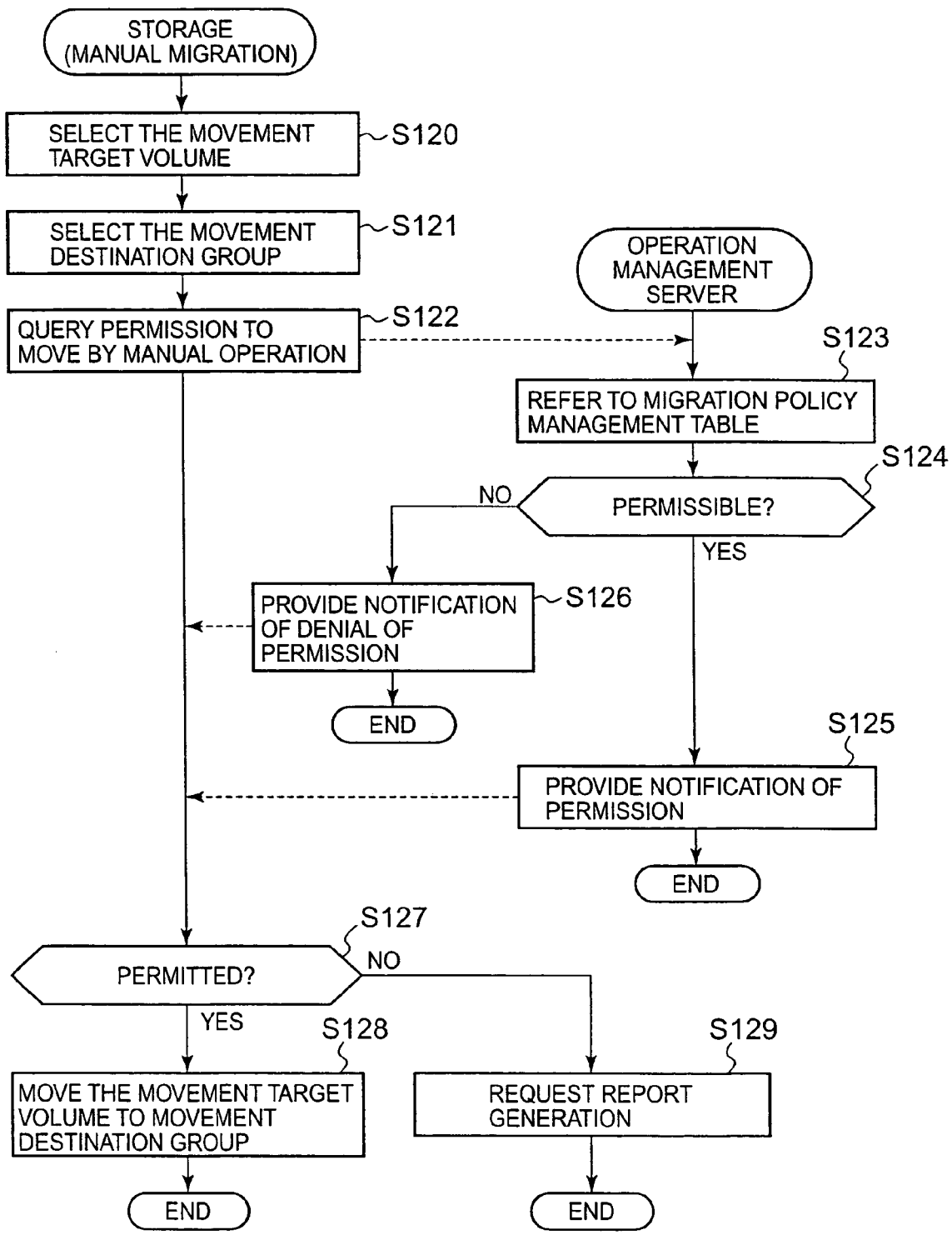
FIG. 16 is a flowchart showing data migration processing by manual operation.

A second embodiment of the present invention will be described with reference to FIG. 16. The embodiments below, including the present embodiment, correspond to a modified example of the first embodiment, and the description of the first embodiment will be invoked where appropriate. The characteristic of the present embodiment is that the permission to carry out data migration by manual operation is also determined by the management server 30.

Described in the first embodiment is the case in which data migration is principally automatically carried out when a prescribed time arrives, but the storage manager (or the host manager) may also carry out data migration by manual operation.

The storage manager selects the movement target volume 220 and the RAID group 222 that is the movement destination of the volume (S120 and S121), and queries approval from the management server 30 to carry out data migration (S122). This query can be carried out manually or automatically. A prompt to obtain permission from the management server 30 can be provided to the storage manager on the screen of the storage management terminal 70, or when the storage manager has directed the start of data migration by manual operation, the query for approval can be made automatically to the management server 30.

When the management server 30 receives a query from the storage device 20, the server refers to the host-side data migration policy registration table T2 (S123) and determines whether to permit the storage device 20 to carry out data migration (S124).

When the storage-side policy and the host-side policy are congruent (S124: YES), the management server 30 notifies the storage device 20 that the data migration is permitted (S125). In contrast, when the storage-side policy and the host-side policy are not congruent (S124: NO), the management server 30 notifies the storage device 20 that the data migration is not permitted (S126).

When permission is received from the management server 30 (S127: YES), the storage device 20 carries out the data migration (S128). When the management server 30 has denied permission to carry out data migration (S127: NO), the storage device 20 requests that the management server 30 generate a report (S129).

Thus, data migration by manual operation can also reflect the intentions of the host side.

Embodiment 3

A third embodiment of the present invention will be described with reference to FIGS. 17 and 18. The characteristic of the present embodiment is that when a problem occurs with respect to data migration of a particular volume, a report is sent to all the host devices 10 connected to the storage device 20 that has this volume.

Figure 17:
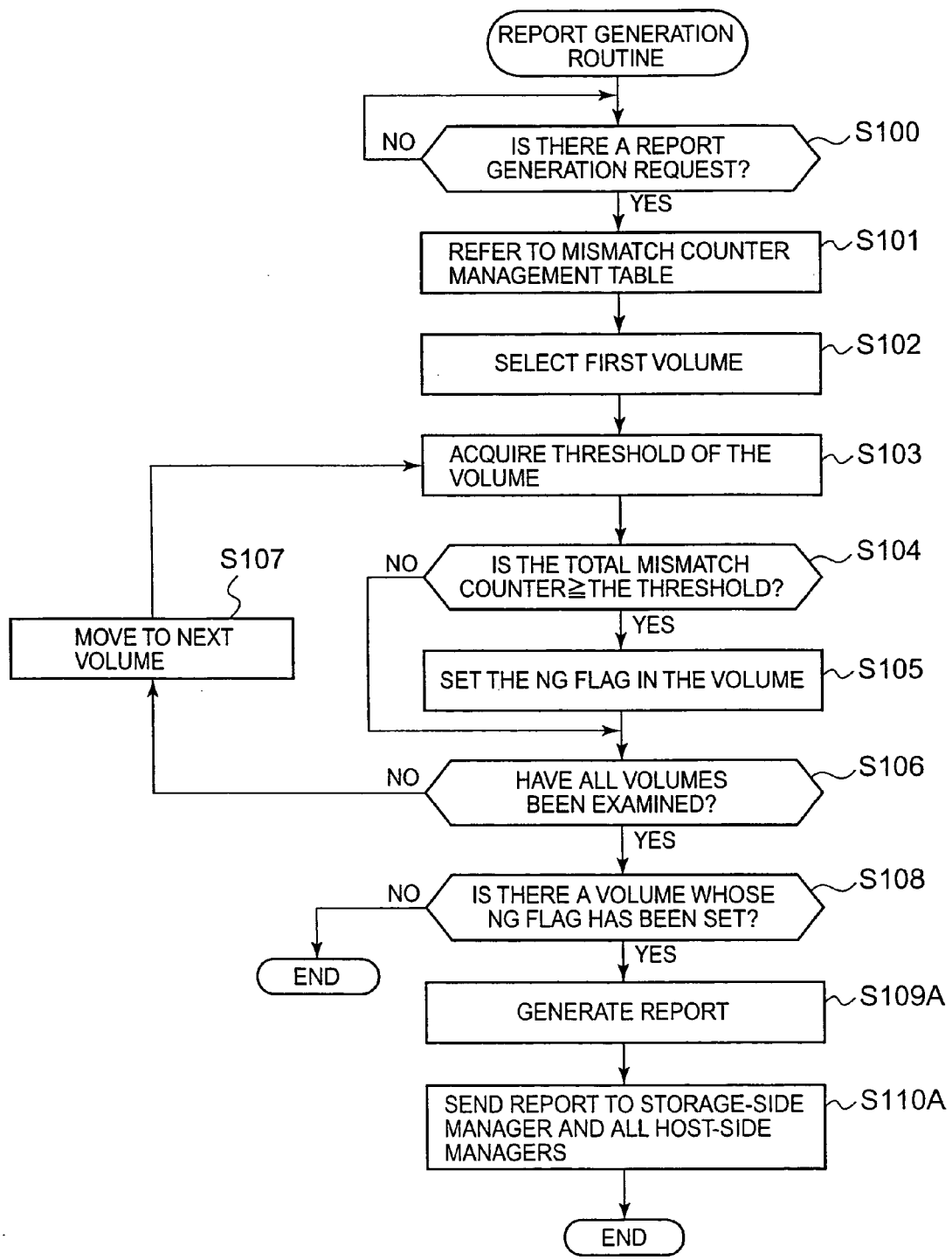
FIG. 17 is a flowchart showing the routine for sending a report to the managers that share a storage device.

FIG. 17 is a flowchart showing the routine for generating a report in accordance with the present embodiment. The flowchart can have all the steps S101 to S108 described in conjunction with FIG. 14. The points that differ in the flowchart of FIG. 14 are that a report is generated (S109A) for all the host managers (or all the host managers and storage managers), and the report is sent to all the host managers (S110A).

The host managers to whom the reports are sent are managers of the all the host devices 10 that use the storage device. When a single manager manages a plurality of host devices 10, a plurality of reports are sent to the host manager.

FIG. 18 is a diagram showing an example of the report R2A for all the host managers. Examples of items that may be included in the common report R2A include information identifying the volume in which a problem occurred with respect to data migration, information seeking a review of the host-side data migration policy set in the volume, information urging other host managers and storage managers to exchange information, the content of the problem related to the data migration detected in the volume, the content of the host-side data migration policy set in the volume, and the usage status of the storage device 20 in which the volume is disposed.

Table T7 showing the state of storage use of the storage device 20 manages the usage state of the RAID groups 222 in the storage device 20. Table T7 classifies the RAID groups 222 on the basis of the disk type and storage redundancy, and shows for each classification the extent to which the RAID groups 222 is being used by which host device 10.

When a problem occurs in the data migration of a volume used by any host device 10, it is possible that part of the cause of thereof is the use of the storage device 20 by another host device 10. For instance, since a particular host device 10 is using a large portion of a specific RAID group 222, there are cases in which another host device 10 cannot move a volume to the RAID group 222.

In view of the above, the present embodiment provides an opportunity to exchange information and the like by sharing with all the host managers (and storage managers) the problem that has occurred with respect to data migration.

The present invention is not limited to the above-described embodiments. Various additions, modifications, and so forth may be carried out within the scope of the present invention by those skilled in the art. Described in the embodiments, for example, was the case in which a volume is moved within the same storage device, but no limitation is imposed thereby, and it is possible to move a volume between a plurality of storage devices, that is to say, move a volume between storage enclosures disposed in the same storage system.

The operation management server can, for example, create a storages-side data migration policy by receiving access frequency or other information from the storage device or storage devices. The operation management server can create a storage-side data migration policy that can implement hierarchical management in the storage system overall by acquiring the required information from the storage devices contained in the storage system.

When the operation management server generates and retains a storage-side data migration policy, the storage devices can relocate a volume on the basis of directions from the operation management server, or by querying the operation management server.

Also possible is a configuration in which a web server function is provided to the operation management server, a dedicated website for data migration can thereby be constructed, the execution status of data migration can be provided to the managers in the dedicated website, and the managers can exchange opinions.

What is claimed is:

1. A storage system having:
at least one or more host devices for executing applications,
at least one or more storage devices for providing to the host device a volume disposed in a prescribed storage area selected from a plurality of types of storage areas, and
a management device connected to the host device and the storage device, for managing the movement of the volume between the storage areas,
wherein the management device determines whether to permit or deny the movement of the volume on the basis of the host device directions related to the movement of the volume, and on the basis of the scheduled movement of the volume by the storage device,
wherein the storage device can move the volume between storage areas on the basis of at least one or more first sets of movement policy information in which an allowable condition for the movement of the volume is set based on intentions and goals determined by the host administrator, and
the management device determines whether to permit the movement of the volume by comparing the first set of movement policy information with at least one or more second sets of movement policy information, different than the first set of movement policy information, related to an access rate of data stored in the volume specified by the host device, when the volume is to be moved between the storage areas, the first set of movement policy information being managed by a first administrator of the host device, the second set of movement policy information being managed by a second administrator of the storage device, different from the first administrator,
wherein the first set of movement policy information denies movement of a volume which is accessed at a rate of access which the second set of movement policy information would permit to be moved, based on intentions and goals determined by the host administrator which indicate that the volume should not be moved in spite of infrequent access to the volume to prevent movement of a volume designated as important not to move by the first set of movement policy information from its present storage area to a storage area having a lower access speed,
wherein the intentions and goals determined by the host administrator include at least one of the following rules regarding movement of the volume designated as important by the first set of movement policy information;
(1) prohibit movement that will render the volume designated as important more inconvenient;
(2) accept some inconvenience regarding access to the volume designated as important in terms of a balance with volumes designated as important by other host devices; and
(3) accept reduced access performance for the volume designated as important if a predetermined level of redundancy is assured.

2. The storage system according to claim 1, wherein the management device includes a movement policy storage unit for storing in advance the second set of movement policy information is provided to the storage device, and
the management device determines whether to permit the movement of the volume by comparing the first set of movement policy information acquired from the storage device with the second set of movement policy information stored in advance in the movement policy storage unit, when the movement of the volume between the storage areas is requested by the host device.

3. The storage system according to claim 1, wherein the management device permits the movement of the volume to the storage device when the first set of movement policy information and the second set of movement policy information are congruent, and prohibits the movement of the volume when the first set of movement policy information and the second set of movement policy information are incongruent.

4. The storage system according to claim 1, wherein the management device is provided with a comparison result storage unit for storing information of the result of comparing the first set of movement policy information with second set of movement policy information, the result including a number of times that the first set of movement policy information and the second set of movement policy information are incongruent and a content of the differences between the first and second sets of movement policy information, and
a notification unit for providing notification to the storage device, the host device, or both regarding the movement of the volume on the basis of the information of the comparison result stored in the comparison result storage unit.

5. The storage system according to claim 4, wherein the content of the differences when the first set of movement policy information and second set of movement policy information are incongruent is stored in the comparison result storage unit.

6. The storage system according to claim 4, wherein the number of times that the first set of movement policy information and the second set of movement policy information are incongruent and the content of the differences of the sets of movement policy information are associated and stored in the comparison result storage unit, and
the notification unit provides notification when there is a request from the host device or the storage device, or when the number of times that the movement policy information has been incongruent has reached a prescribed value set in advance.

7. The storage system according to claim 4, wherein the notification unit provides notification to each of the host devices when there is a plurality of host devices present.

8. A data movement method for moving a data constellation that is used by a host device between a plurality of types of storage areas provided by the storage device, comprising:

storing a first movement policy of the host device, managed by a first administrator of the host device, related to the movement of the data constellation, wherein the first movement policy is based on intentions and goals determined by the first administrator of the host device;

acquiring a second movement policy of the storage device, different from the first movement policy, managed by a second administrator of the storage device, different from the first administrator, the second movement policy being related to an access rate of data stored in a volume of the storage device specified by the host device when a data constellation movement request has been generated;

comparing the stored first movement policy of the host device and the acquired second movement policy of the storage device, and determining whether both are congruent, permitting the movement of the data constellation when the first and second movement policies are congruent, storing points of difference between the first movement policy of the host device and the second movement policy of the storage device when the first and second movement policies are incongruent; and notifying one or both of the storage device and host device of the information related to the points of difference, wherein the first movement policy denies movement of a data constellation which is accessed at a rate of access which the second movement policy would permit to be moved, based on intentions and goals determined by the first administrator of the host device which indicate that the data constellation should not be moved in spite of infrequent access to the data constellation to prevent movement of a volume designated as important not to move by the first set of movement policy information from its present storage area to a storage area having a lower access speed, wherein the intentions and goals determined by the host administrator include at least one of the following rules regarding movement of the volume designated as important by the first set of movement policy information;

(1) prohibit movement that will render the volume designated as important more inconvenient;

(2) accept some inconvenience regarding access to the volume designated as important in terms of a balance with volumes designated as important by other host devices; and (3) accept reduced access performance for the volume designated as important if a predetermined level of redundancy is assured.

* * * * *